US012651973B2

(12) United States Patent
Vasiladiotis et al.

(10) Patent No.: US 12,651,973 B2
(45) Date of Patent: Jun. 9, 2026

(54) METHOD FOR OPERATING A CONVERTER, CONVERTER AND COMPUTER PROGRAM PRODUCT

(71) Applicant: Hitachi Energy Ltd, Zürich (CH)

(72) Inventors: Michail Vasiladiotis, Zurich (CH); Nicolas Sierro, Uvrier (CH)

(73) Assignee: Hitachi Energy Ltd., Zürich (CH)

( * ) Notice: Subject to any disclaimer, the term of this patent is extended or adjusted under 35 U.S.C. 154(b) by 245 days.

(21) Appl. No.: 18/023,798

(22) PCT Filed: Aug. 26, 2021

(86) PCT No.: PCT/EP2021/073639
§ 371 (c)(1),
(2) Date: Feb. 28, 2023

(87) PCT Pub. No.: WO2022/043452
PCT Pub. Date: Mar. 3, 2022

(65) Prior Publication Data
US 2023/0318474 A1      Oct. 5, 2023

(30) Foreign Application Priority Data

Aug. 28, 2020    (EP) .................................... 20193292

(51) Int. Cl.
*H02M 7/5387*      (2007.01)
*H02M 1/00*        (2006.01)
(Continued)

(52) U.S. Cl.
CPC ....... *H02M 5/2932* (2021.05); *H02M 1/0025* (2021.05); *H02M 7/219* (2013.01); *H02M 7/53871* (2013.01)

(58) Field of Classification Search
CPC ...... H02M 7/219; H02M 7/2195; H02M 7/23; H02M 7/25; H02M 7/21717; H02M 7/162;
(Continued)

(56) References Cited

U.S. PATENT DOCUMENTS

| | | | | |
|---|---|---|---|---|
| 9,787,217 B2 * | 10/2017 | Hu | .......................... | H02M 7/23 |
| 2020/0220471 A1 * | 7/2020 | Kikuchi | ................ | H02M 5/458 |
| 2023/0066656 A1 * | 3/2023 | Kajiyama | ............. | H02M 7/217 |

FOREIGN PATENT DOCUMENTS

EP          2946466 B1      7/2016

OTHER PUBLICATIONS

Angquist, L., et al., "Inner Control of Modular Multilevel Converters—An Approach Using Open-Loop Estimation of Stored Energy," The 2010 International Power Electronics Conference, Jun. 21-24, 2010, 7 pages.
(Continued)

*Primary Examiner* — Nguyen Tran
(74) *Attorney, Agent, or Firm* — Slater Matsil, LLP

(57) ABSTRACT
A method can be used for operating a converter that converter includes a control arrangement and modular-multilevel converters that are coupled in a parallel circuit. Each modular-multilevel converters includes branches, each having a cell with a capacitor and semiconductor switches. First voltage reference signals are generated as a function of a DC voltage reference and measured signals gained at the modular-multilevel converters and a second voltage reference signal is generated as a function of a first terminal reference. An inner voltage reference signal is generated as a function of an average DC voltage reference and of branch capacitor voltage signals. The first voltage reference signals, the second voltage reference signal and the inner voltage reference signal are combined into a branch control signal for each branch. Cell control signals are generated as a function
(Continued)

of the branch control signals and provided to the semiconductor switches.

20 Claims, 15 Drawing Sheets

(51) Int. Cl.
  *H02M 5/293*   (2006.01)
  *H02M 7/219*   (2006.01)

(58) Field of Classification Search
  CPC ......... H02M 7/53871; H02M 7/53873; H02M
      7/53875; H02M 1/0025; H02M 1/0003;
      H02M 5/2932; H02M 5/2937; H02M
              5/297; H02M 5/293
  See application file for complete search history.

(56) References Cited

OTHER PUBLICATIONS

Gao, F., et al., "Control of Parallel-Connected Modular Multilevel Converters," IEEE Transactions on Power Electronics, vol. 30, Issue 1, Mar. 24, 2014, 7 pages.

Jiang, Y, et al., "Control of Circulating Current in Parallel Three-Phase Inverter in MW Wind Power System," 2010 International Conference on Electrical Machines and Systems, Oct. 10-13, 2010, 4 pages.

Korn, A, "MMLC Control," Scorpius, V1.1, May 12, 2009, 31 pages.

Milovanovic, S., et al., "On Facilitating the Modular Multilevel Converter Power Scalability Through Branch Paralleling," 2019 IEEE Energy Conversion Congress and Exposition, Sep. 29-Oct. 3, 2019, 8 pages.

Milovanovic, S., et al., "On Power Scalability of Modular Multilevel Converters," IEEE Power Electronics Magazine, Jun. 2020, 11 pages.

Steurer, M., et al., "Multifunctional Megawatt-Scale Medium Voltage DC Test Bed Based on Modular Multilevel Converter Technology," IEEE Transactions on Transportation Electrification, vol. 2, No. 4, Dec. 2016, 10 pages.

Vasiladiotis, M., et al., "IGCT-Based Direct AC/AC Modular Multilevel Converters for Pumped Hydro Storage Plants," 2018 IEEE Energy Conversion Congress and Exposition, Sep. 23-27, 2018, 8 pages.

Vasiladiotis, M., et al., "Model Predictive Pulse Pattern Control for Modular Multilevel Converters," IEEE Transactions on Industrial Electronics, vol. 66, No. 3, Mar. 2019, 9 pages.

Vasiladiotis, M., et al., "Power and DC Link Voltage Control Considerations for Indirect AC/AC Modular Multilevel Converters," Proceedings of the 2011 14th European Conference on Power Electronics and Applications, Aug. 30-Sep. 1, 2011, 10 pages.

* cited by examiner

FIG 4C

METHOD FOR OPERATING A CONVERTER, CONVERTER AND COMPUTER PROGRAM PRODUCT

CROSS-REFERENCE TO RELATED APPLICATIONS

This application is a national stage application of International Application No. PCT/EP2021/073639, filed on Aug. 26, 2021, which claims priority to European Patent Application No. 20193292.8, filed on Aug. 28, 2020, which applications are hereby incorporated herein by reference.

TECHNICAL FIELD

The disclosure is related to a method for operating a converter, a converter and a computer program product.

BACKGROUND

The converter typically converts electric power at medium and high voltages. For example, the converter converts high voltage alternating current (AC) with a first frequency to high voltage alternating current with a second frequency, abbreviated as AC/AC converter. Alternatively, the converter converts electric power from high voltage alternating current to high voltage direct current (DC) or vice versa. Often a converter is realized bi-directionally. Thus, the converter can convert electric power from a first side of the converter to a second side of the converter and also from the second side to the first side. The AC voltage may be provided using three phases or a single phase.

The converter often includes a modular-multilevel converter (abbreviated as MMC). In order to achieve a higher current flow from the first side of the converter to the second side of the converter, two or more MMCs can be arranged in the form of a parallel circuit. A small mismatch of the characteristics of the parallel connected MMCs may result in disturbances of the conversion.

The publication "Control of Parallel-Converter Modular Multilevel Converters", Feng Gao et al., IEEE Transactions on Power Electronics, Vol. 30, No. 1, pp. 372-386, 2015 describes a converter with two parallel connected MMCs.

SUMMARY

Embodiments provide a method for operating a converter, a converter and a computer program product with a reduced influence of a mismatch between MMCs.

One embodiment provides a method for operating a converter. The converter comprises a control arrangement and a first number Z of modular-multilevel converters that are coupled in a parallel circuit. The first number Z is larger than 1 and each of the first number Z of modular-multilevel converters comprises a number M of branches. Each of the number M of branches comprises at least a cell with a capacitor and semiconductor switches.

The method comprises generating a first number Z of first voltage reference signals by a control module of the control arrangement as a function of a DC voltage reference and a first number Z of measured signals gained at the first number Z of modular-multilevel converters. A second voltage reference signal is generated by the control module as a function of a first terminal reference. At least an inner voltage reference signal is generated by the control module as a function of at least an average DC voltage reference and of branch capacitor voltage signals generated by detecting capacitor voltages of the capacitors of the cells of each branch. At least the first number Z of first voltage reference signals, the second voltage reference signal and the at least one inner voltage reference signal are combines into a branch control signal for each branch of each modular-multilevel converter by a reference computation module of the control arrangement. Cell control signals are generated by a first number Z of valve control modules of the control arrangement as a function of the branch control signals. The cell control signals is provided to the semiconductor switches of the cells.

The definitions as described above also apply to the following description unless otherwise stated.

BRIEF DESCRIPTION OF THE DRAWINGS

The following description of figures of examples or embodiments may further illustrate and explain aspects of the converter and the method for voltage conversion. Arrangements, devices, modules and blocks with the same structure and the same effect, respectively, appear with equivalent reference symbols. In so far as arrangements, devices, modules, and blocks correspond to one another in terms of their function in different figures, the description thereof is not repeated for each of the following figures.

FIGS. 3A to 3D, 4A to 4C, 5, 6, 7A and 7B show exemplary embodiments of a converter with two MMCs.

DETAILED DESCRIPTION OF ILLUSTRATIVE EMBODIMENTS

Figure 1A:
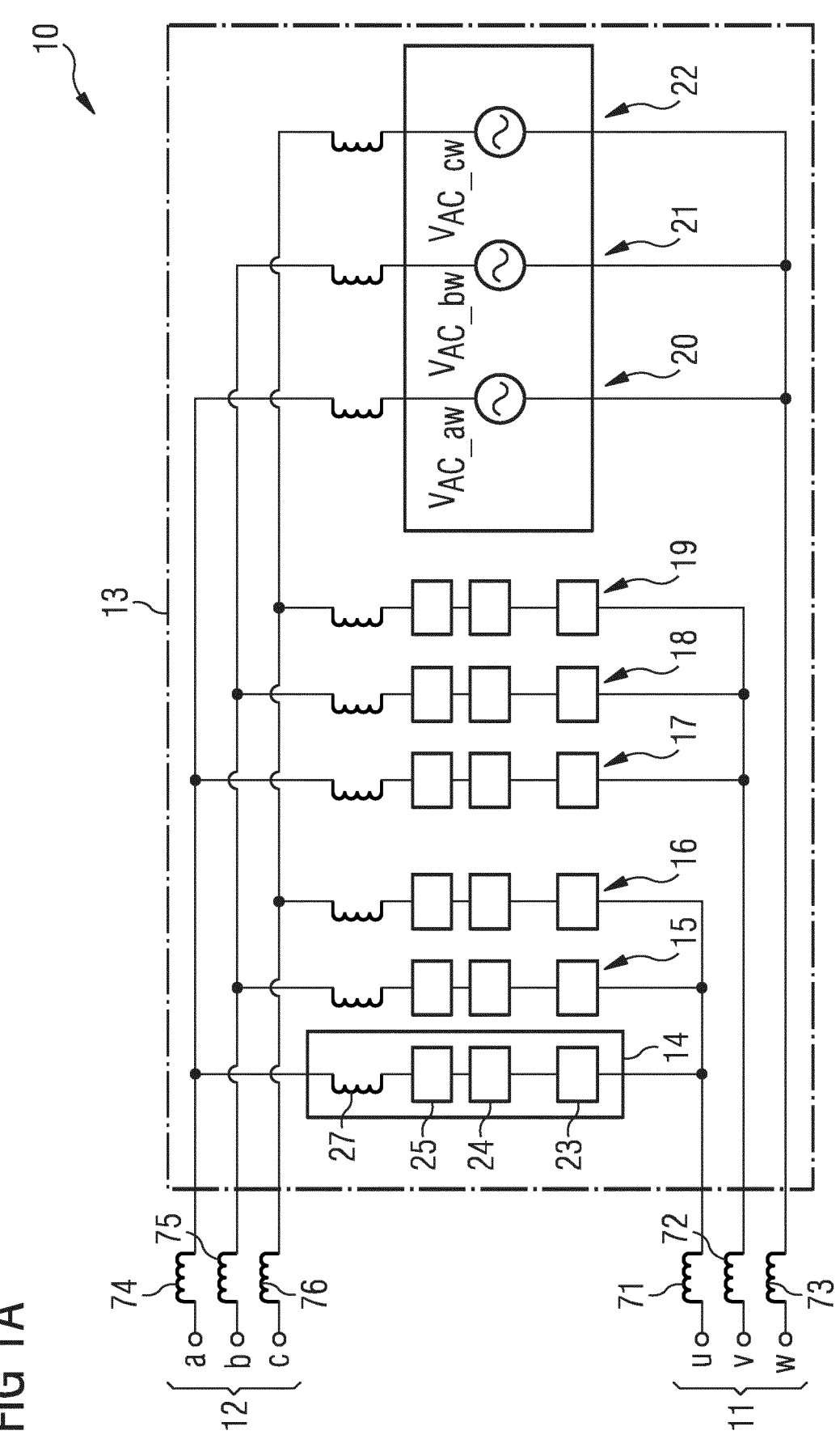
FIGS. 1A to 1D show an exemplary embodiment of a converter with a MMC.

The following describes a method for operating a converter. Embodiments will first be described followed by a description with respect to the drawings.

The converter comprises a control arrangement and a first number Z of modular multilevel converters, abbreviated MMCs, which are coupled in a parallel circuit. The first number Z is larger than 1. Each of the first number Z of MMCs comprises a number M of branches. Each of the number M of branches comprises at least a cell with a capacitor and semiconductor switches.

The method comprises generating at least a first voltage reference signal by a control module of the control arrangement as a function of a DC voltage reference, generating a second voltage reference signal by the control module as a function of a first terminal reference, generating at least an inner voltage reference signal by the control module as a function of at least an average DC voltage reference and of branch capacitor voltage signals generated by detecting capacitor voltages of the capacitors of the cells of each branch, combining at least the at least one first voltage reference signal, the second voltage reference signal and the at least one inner voltage reference signal into a branch control signal for each branch of each MMC by a reference computation module of the control arrangement, generating cell control signals by a first number Z of valve control modules of the control arrangement as a function of the branch control signals, and providing the cell control signals to the semiconductor switches of the cells.

Advantageously, the control arrangement provides branch control signals which depend on the first voltage reference signal, the second voltage reference signal and the inner voltage reference signal to control branches of the MMCs.

Since the inner voltage reference signal depends on the capacitor voltages of the cells, these capacitor voltages can be balanced. Thus, the influence of a mismatch between MMCs is reduced.

In a development of the method, the first voltage reference signal is a grid voltage reference signal. The second voltage reference signal may be, e.g., a motor voltage reference signal or a further grid voltage reference signal.

In a development of the method, the first number Z of MMCs are coupled on one side to a first terminal of the converter and on another side to a second terminal of the converter.

In a development of the method, the first terminal reference is at least one of a motor speed reference, an active power reference, and a further grid voltage reference. The first terminal reference is a reference related to a motor, a further grid, or another apparatus coupled to the first terminal of the converter. The first terminal reference, e.g., has a predetermined value.

In a development of the method, the DC voltage reference is realized as a DC link voltage reference, e.g., in case that a DC voltage can be tapped at a DC link between an AC/DC converter and a DC/AC converter or can be tapped at the first or second terminal of the converter. The DC voltage reference may be realized as a virtual DC link voltage reference, e.g., in the case that a DC voltage cannot be tapped as described above, but can be tapped at branches of the MMCs. Typically, the DC voltage difference is different from the average DC voltage reference. In some cases, the DC voltage difference may be equal to the average DC voltage reference.

In a development of the method, the reference computation module adds and/or subtracts at least the at least one first voltage reference signal, the second voltage reference signal and the at least one inner voltage reference signal for combining these signals into the branch control signal for each branch of each MMC.

In a development of the method, the control module receives a first number Z of branch capacitor voltage signals determined at the first number Z of MMCs by detecting capacitor voltages of the capacitors of the cells, generates at least a balancing signal as a function of the first number Z of the branch capacitor voltage signals, and provides the at least one balancing signal to the reference computation module.

In a development of the method, the control module receives the branch capacitor voltage signals, generates a first number Z of inner voltage reference signals as a function of a first number Z of average DC voltage references and of the branch capacitor voltage signals, and provides the first number Z of inner voltage reference signals to the reference computation module.

In a development of the method, the reference computation module comprises a first number Z of reference computation blocks. A block of the first number Z of reference computation blocks generates branch control signals as a function of the first voltage reference signal, the second voltage reference signal, the inner voltage reference signal of the first number Z of inner voltage reference signals and the at least one balancing signal, and provides the branch control signals to a valve control module of the first number Z of valve control modules.

A part of a module is, e.g., named block.

In a development of the method, the control module receives the branch capacitor voltage signals, generates inner voltage reference signals as a function of a comparison of the branch capacitor voltage signals with the average DC voltage reference, generates difference balance signals as a function of a comparison of the branch capacitor voltage signals with each other, and provides the inner voltage reference signals and the difference balance signals to the reference computation module.

In a development of the method, the reference computation module generates branch control signals as a function of the first voltage reference signal, the second voltage reference signal, the inner voltage reference signals and the difference balance signals, and provides the branch control signals to the first number Z of valve control modules.

In a development of the method, the control module generates a first number Z of first voltage reference signals as a function of the DC voltage reference and a first number Z of measured signals gained at the first number Z of MMCs and provides the first number Z of first voltage reference signals to the reference computation module.

In an example, the measured signals are gained by measuring a DC voltage at the first or second terminal, a DC link between an AC/DC converter and a DC/AC converter or across branches of the MMCs.

In an example, each MMC of the first number Z of MMCs has its own value of the DC voltage reference. The DC voltage reference may be a DC link voltage reference or a virtual DC link voltage reference. Thus, the control module generates a first number Z of first voltage reference signals as a function of a first number Z of values of the DC voltage reference and a first number Z of measured signals gained at the first number Z of MMCs. The values of the first number Z of values are, e.g., different or equal.

In an alternative example, each MMC of the first number Z of MMCs has the same value of the DC voltage reference. Thus, the control module generates a first number Z of first voltage reference signals as a function of the same value of the DC voltage reference and a first number Z of measured signals gained at the first number Z of MMCs. Thus, the DC voltage reference is realized by one value or by a first number Z of different values.

In a development of the method, the at least an average DC voltage reference includes or is implemented by a first number Z of average DC voltage references. One of the first number Z of the average DC voltage references is a function of the detected or measured capacitor voltages of the capacitors of the cells of each branch of the corresponding one of the first number Z of modular-multilevel converters. Thus, the values of the first number Z of average DC voltage references are, e.g., not fixed and/or are not predetermined. The function is, e.g., realized by summing up or averaging the detected or measured capacitor voltages of the capacitors of the cells of each branch of one of the first number Z of modular-multilevel converters.

In a development of the method, the control module receives the branch capacitor voltage signals, generates a first number Z of inner voltage reference signals as a function of a first number Z of average DC voltage references and of the branch capacitor voltage signals, and provides the first number Z of inner voltage reference signals to the reference computation module.

In a development of the method, the reference computation module comprises a first number Z of reference computation blocks. A block of the first number Z of reference computation blocks generates branch control signals as a function of the first voltage reference signal of the first number Z of first voltage reference signals, the second voltage reference signal and the inner voltage reference signal of the first number Z of inner voltage reference signals, and provides the branch control signals to the valve control module of the first number Z of valve modules.

In a development of the method, each branch comprises a number N of cells and a branch inductance which form a series circuit. Each MMC of the first number Z of MMCs comprises a first terminal and a second terminal. The branches are coupled to the first terminal via first inductances of the converter, and/or the branches are coupled to the second terminal via second inductances of the converter. In other words, the branches are coupled to the first terminal via a first to a third inductance of the converter and/or the branches are coupled to the second terminal via a fourth to a sixth inductance of the converter.

In a development of the method, the converter is realized as a direct AC/AC converter. Each branch comprises a number N of cells which are realized as full bridge cells. A cell may also be named valve.

In a development of the method, the converter is realized as a double star AC/DC converter. Each branch comprises a number N of cells which are realized as half bridge cells or full bridge cells.

The method performs the steps in real-time. Thus, the method operates on-line.

There is provided a converter comprising a control arrangement and a first number Z of MMCs which are coupled in a parallel circuit. The first number Z is larger than 1. Each of the first number Z of MMCs comprises a number M of branches. Each of the number M of branches comprises at least a cell with a capacitor and semiconductor switches. The converter is configured to execute the steps of the method for operating a converter described above.

There is provided a computer program product comprising instructions to cause the converter described above to execute the steps of the method described above. The computer program product realizes, e.g., at least one of the modules and blocks described in this disclosure.

The converter and the computer program product described above is particularly suitable for the method for operating a converter. Features described in connection with the converter and the computer program product can therefore be used for the method and vice versa.

In a development, the disclosure relates to the control of parallel MMCs which can be named MMC units in a direct configuration. Paralleling converters allows to extend the power in applications such as variable-speed pumped hydro storage plants as well as railway interties. On the other hand, a proper control is required. Indeed, the energy stored in the capacitors used to buffer the power required for the conversion is balanced to avoid extra losses, derating, harmonics or in worst cases, damage of the converters. Several control alternatives with their own advantages are described in this disclosure. The method balances the capacitor voltage, e.g., by using the parallel current, which is ideally mitigated in the steady state. Three different control variants of the method are described and are referred as converter-based control, branch-based control and independent energy control.

Referring now to the figures, FIG. 1A shows an exemplary embodiment of a converter 10 that is realized as an AC/AC converter. The converter 10 is implemented as a direct AC/AC converter. The converter 10 has a first terminal 11 with three phases u, v, w. Moreover, the converter 10 has a second terminal 12 with three phases a, b, c. The converter 10 comprises a first modular-multilevel converter 13, abbreviated as MMC. The first MMC 13 comprises a number M of branches 14 to 22. In FIG. 1A, the number M is nine. The branches can be called "legs" or "arms". A first to a third branch 14 to 16 couples the phase u of the first terminal 11 to each of the phases a, b, c of the second terminal 12. Correspondingly, a fourth to a sixth branch 17 to 19 couples the phase v of the first terminal 11 to each of the phases a, b, c of the second terminal 12. Similarly, a seventh to a ninth branch 20 to 22 couples the phase w of the first terminal 11 to the phases a, b, c of the second terminal 12.

Each of the branches 14 to 22 comprises a number N of cells 23 to 25. A cell can be named submodule. In the example shown in FIG. 1A, the number N is 3. However, the number N may also be 2, 4 or higher than 4. The number N of cells 23 to 25 of a branch are connected in series. Additionally, each of the branches 14 to 22 comprise a branch inductance 27 that is connected in series to the number N of cells 23 to 25. Each of the branches 15 to 22 has, e.g., the same structure as the first branch 14.

Moreover, the converter 10 comprises a first to a third inductance 71 to 73 that couple the three phases u, v, w of the first terminal 11 to the first MMC 13. Thus, the first inductance 71 couples the phase u to the first to the third branch 14 to 16. The second inductance 72 couples the phase v to the fourth to the sixth branch 17 to 19. The third inductance 73 couples the phase w to the seventh to the ninth branch 20 to 22. Similarly, the converter 10 comprises a fourth to a sixth inductance 74 to 76 which couple the three phases a, b, c of the second terminal 12 to the first MMC 13. Thus, the fourth inductance 74 couples the phase a to the first, fourth and seventh branch 14, 17, 20. The fifth inductance 75 couples the phase b to the second, fifth and eights branch 15, 18, 21. The sixth inductance 76 couples the phase c to the third, sixths and ninth branch 16, 19, 22.

On the right side an equivalent circuit for the seventh to the ninth branch 20 to 22 is shown instead of the physical realization of these branches. Also the seventh to the ninth branch 20 to 22 are fabricated such as the first branch 14. According to the equivalent circuit, the series circuit of the number N of cells 23 to 25 is equivalent to an AC voltage source that provides a voltage VAC_aw.

An AC/AC conversion can be performed either with a back-to-back converter or with a direct MMC. However, a direct MMC may perform better in terms of capacitor voltage ripple, when the converter 10 operates significant input/output frequency difference. The exemplary converter configuration could be used, e.g., in a pumped hydro installation with a nominal power of, e.g., 80 MW and a variable motor frequency around, e.g., 30 Hz. The concept developed uses a Converter Fed Synchronous Machine (CFSM), which proved higher flexibility and efficiency compared to Doubly Fed Induction Machines (DFIM) and a good and controlled Fault-Ride-Trough (FRT) behavior. The configuration of the direct MMC is shown in FIG. 1A. Each cell 23 to 25 consists, e.g., of a full bridge cell, shown in FIG. 1D. The grids phases x={a,b,c} are connected to the motor phases y={u,v,w} via the branches 14 to 22 of the first MMC 13. From a control perspective, each cell 23 to 25 can be simplified to an equivalent circuit consisting in an ideal AC voltage source.

Figure 1B:
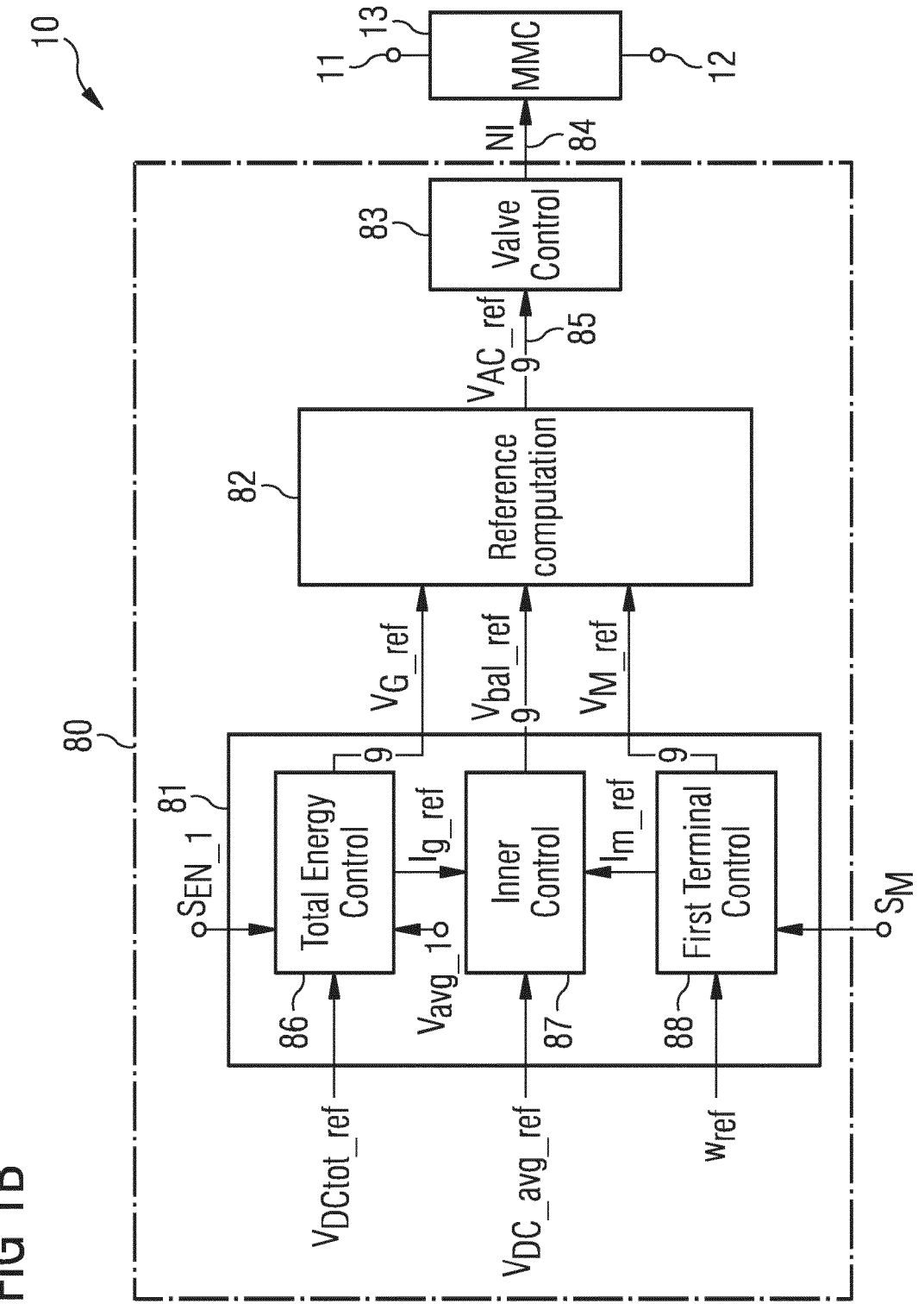

FIG. 1B shows an exemplary embodiment of a converter 10 which is a further development of the embodiment shown in FIG. 1A. The converter 10 comprises the first MMC 13 that can be realized as shown in FIG. 1A or may have another configuration. Moreover, the converter 10 comprises a control arrangement 80. The control arrangement 80 comprises a control module 81, a reference computation module 82 and a first valve control module 83. The first valve control module 83 has output terminals that are coupled to input terminals of the first MMC 13. Each of the cells 23 to 25 has a number T of input terminals. Thus, the number of the input terminals of the first MMC 13 and thus a number NI of connection lines 84 between the output terminals of the first valve control module 83 and the first MMC 13 can be calculated according to the following equation:

$$NI = M \cdot N \cdot T,$$

wherein M is the number of branches of the first MMC 13, N is the number of cells of a branch of the first MMC 13 and T is the number of semiconductors of a cell or of semiconductor switches of a cell. The number T may be four in case of full-bridge cells. Thus, in the case of M=9 branches and N=3 cells per branch, the number NI is 108.

The reference computation module 82 provides branch control signals VAC_ref to the first valve control module 83, e.g., via connection lines 85. Per each branch of the first MMC 13 one branch control signal VAC_ref is provided by the reference computation module 82. Thus, the reference computation module 82 provides the number M of branch control signals VAC_ref to the first valve control module 83. In the example, the number M is 9. The branch control signals VAC_ref can be digital signals. Alternatively, the branch control signals VAC_ref can be analog signals which have, e.g., the form of voltages. The first valve control module 83 generates cell control signals S1 to S5 for the cells 23 to 25 as a function of the branch control signals VAC_ref.

The control module 81 comprises a first total energy control block 86, a first inner control block 87 and a first terminal control block 88. The first terminal control block 88 may be a motor control block, e.g., in case a motor, machine, pump, or other apparatus is coupled or connected to the first terminal 11. The first terminal control block 88 may be a further grid control block, in case, e.g., a further grid is connected to the first terminal 11. The first total energy control block 86 has a DC voltage reference VDCtot_ref as an input. The DC voltage reference VDCtot_ref can be provided by an external source such as a system computer (not shown in FIG. 1B) or can be a predetermined value that is stored in the control arrangement 80.

The first inner control block 87 has as an input an average DC voltage reference VDC_avg_ref. The value of the average DC voltage reference VDC_avg_ref can also be provided by an external source such as a system computer or can be stored in the control arrangement 80. In an example, the system computer uses an average of measured voltages of the converter 10.

The first terminal control block 88 has a first terminal reference wref as an input. The first terminal reference wref can be a motor speed reference or an active power reference or a grid voltage reference. The first terminal reference wref has a predetermined value that depends, e.g., on the load or grid connected to the first terminal 11. These values can also be supplied from an external source such as a system computer or can be stored inside the control arrangement 80. The control module 81, especially the first total energy control block 86, the first inner control block 87 and the first terminal control block 88, can receive measurement signals (partially not shown) gained in the converter 10, for example gained at the cells 23 to 25 of the first MMC 13.

The first total energy control block 86 provides an output signal Ig_ref to the first inner control block 87. The first terminal control block 88 provides an output signal Im_ref to the first inner control block 87.

The control module 81 provides reference signals to the reference computation module 82. More specifically, the first total energy control block 86 generates a first voltage reference signal VG_ref as a function of the DC voltage reference VDCtot_ref and a measured signal SEN_1 and provides the first voltage reference signal VG_ref to the reference computation module 82. The first voltage reference signal VG_ref may include several "partial" signals; the number of signals may be equal to the number M of branches (in this example nine) or may be equal to the number of phases at the second terminal 12 (which is three in this example). The first voltage reference signal VG_ref may be realized as grid voltage reference signal.

Correspondingly, the first inner control block 87 generates an inner voltage reference signal Vbal_ref as a function of the average DC voltage reference VDC_avg_ref, branch capacitor voltage signals Vavg_1 and the output signals Ig_ref, Im_ref of the first total energy control block 86 and of the first terminal control block 88 and provides the inner voltage reference signal Vbal_ref to the reference computation module 82. For each of the branches 14 to 22, one branch capacitor voltage signal Vavg_1 is measured. The inner voltage reference signal Vbal_ref may include several "partial" signals; the number of signals may be equal to the number M of branches.

Similarly, the first terminal control block 88 provides a second voltage reference signal VM_ref as a function of the first terminal reference wref and a further measurement signal SM and provides the second voltage reference signal VM_ref to the reference computation module 82. The further measurement signal SM is measured at a motor, pump, further apparatus or further grid coupled or connected to the first terminal 11. The second voltage reference signal VM_ref may include several "partial" signals; the number of signals may be equal to the number M of branches or may be equal to the number of phases at the first terminal 11 (which is three in this example). The second voltage reference signal VM_ref may be realized, e.g., as motor voltage reference signal or further grid voltage reference signal.

The reference computation module 82 combines the reference signals into the branch control signals VAC_ref provided to the first valve control module 83, e.g., by adding and subtracting the reference signals, namely the first voltage reference signal VG_ref, the inner voltage reference signal Vbal_ref and the second voltage reference signal VM_ref. One branch signal VAC_ref for one of the number M of branches is generated by adding and/or subtracting the first voltage reference signal VG_ref, the inner voltage reference signal Vbal_ref and the second voltage reference signal VM_ref referring to this branch.

The control of a single MMC 13 can be divided into sub-categories as illustrated in FIG. 1B. The power or speed of a motor is modified by the first terminal control block 88. The motor (not shown) may be connected to the first terminal 11. The first total energy control block 86 adjusts the energy stored inside capacitors, namely $$W_C = \frac{1}{2} C \sum_{x,y,n} Vc_{xyn}^2$$

with C is a capacitance value of a capacitor in one full-bridge cell, and $Vc_{xyn}$ is a voltage corresponding to the branch connected to the grid phase x={a,b,c}, the motor phase y={u,v,w}, and the cell n={1, . . . N}. The first inner control block 87 makes sure that the sum of the capacitor voltages in the branches are well balanced to avoid unnecessary losses inside the converter 10. The first valve controller or first valve control module 83 performs the modulation of the cells 23 to 25.

Except for some slight change in the gains of the controllers, modules or blocks, the motor and total energy control strategy remains the same for the parallel MMCs (shown in FIGS. 2A to 7B), only the inner control is of interest and is adapted for the different variants of the method. The inner control constitutes a challenging part from a control perspective, the objective is to balance the DC capacitor voltage across the branches (which can be named legs), namely each phase-leg equivalent capacitor voltage VDCavg should be equal to:

$$V^*_{DC_{avg}} = \frac{1}{9}\sum\nolimits_{x,y,n} V_{DC_{xyn}}.$$

The average DC voltage reference VDC_avg_ref can be calculated using the equation:

$$V_{DC\_avg\_ref} = \frac{1}{9}\sum\nolimits_{x,y,n} V_{DC_{xyn}}.$$

The average DC voltage reference VDC_avg_ref is a function of the detected capacitor voltages Vc or $V_{DC_{xyn}}$ of the capacitors 105 of the cells 23 of each branch 14 to 22 of the first MMC 13.

In general, it may not be possible to completely eliminate the steady state error between the capacitor voltages. The main reason is that one tries to control more variables compared to the degrees of freedom of the converter 10. Therefore, some proportional controllers (abbreviated P controllers) are used instead of proportional-integral controllers (abbreviated PI controllers) for the realization of the control module 81 and the blocks 86 to 88 in order to approach the reference values as close as possible and avoid instability.

Figure 1C:
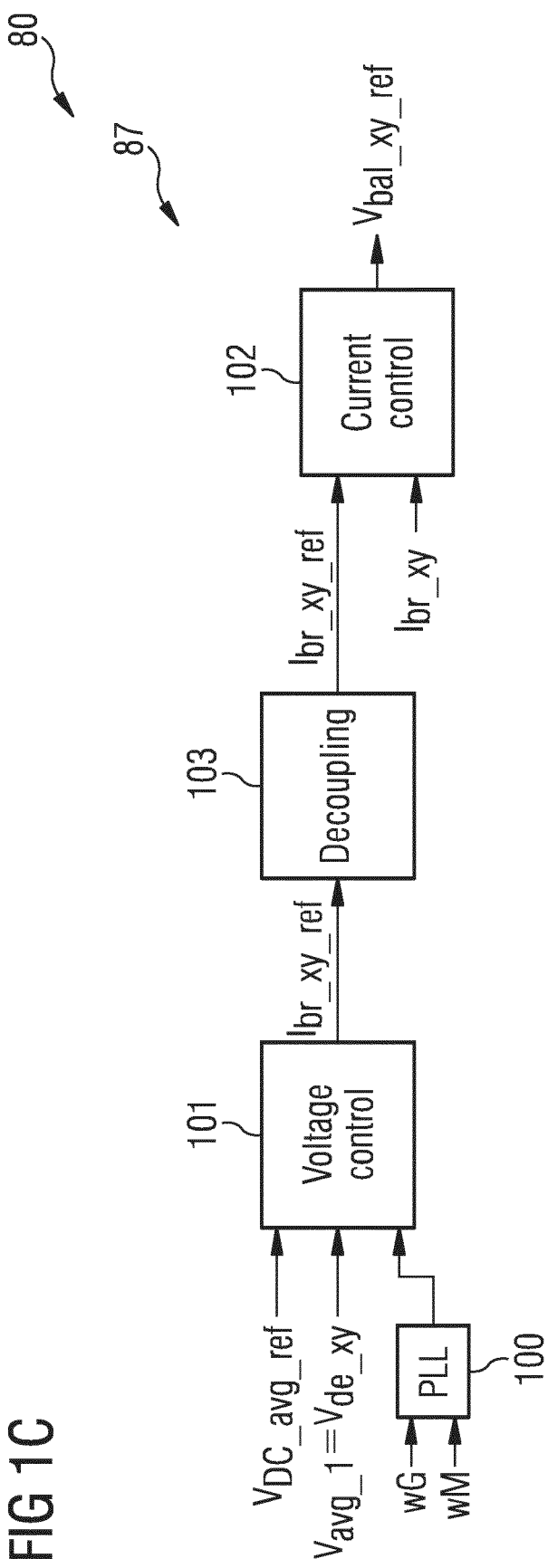

FIG. 1C shows an exemplary embodiment of details of a control arrangement 80 which is a further development of the embodiment shown in FIG. 1B. The control arrangement 80 comprises a phase locked loop 100 (abbreviated PLL) which is coupled on its input side to the first terminal 11 and to the second terminal 12 of the converter 10. The first terminal 11 of the converter 10 can be connected to a motor (shown in FIG. 2A). Moreover, the second terminal 12 of the converter 10 may be connected to a grid (shown in FIG. 2A). Thus, the PLL 100 receives signals wG, wM indicating the rotation speed of the phases at the first terminal 11 and at the second terminal 12 of the converter 10. Thus, the PLL 100 generates a clock phase or several clock phases that are applied to the control arrangement 80.

The first inner control block 87 comprises a voltage control block 101 and a current control block 102 that is coupled on its input side to an output side of the voltage control block 101. A decoupling block 103 may generate the signals provided to the current control block 102 as a function of the signals generated by the voltage control block 101. The voltage control block 101 receives a clock signal of the PLL 100, the average DC voltage reference VDC_avg_ref and the branch capacitor voltage signal Vavg_1. The branch capacitor voltage signal Vavg_1 includes DC voltage signals Vdc_xy measured at the branches 14 to 22 of the first MMC 13. The index x represents the phases a, b, c that may be called grid phases and the index y is indicating the phases u, v, w that may be called motor phases. The current control block 102 receives measurement signals Ibr_xy representing branch currents measured at the number M of branches of the first MMC 13. The current control block 102 provides the inner voltage reference signal Vbal_ref which is realized as partial inner voltage reference signals Vbal_xy_ref, since one inner voltage reference signal for each of the number M of branches 14 to 22 is generated.

The inner control as presented in FIG. 1C realizes a cascaded capacitor voltage/inductance current control. The decoupling block 103 is advantageous in order to avoid modifying the grid and motor current while balancing the cells 23 to 25.

Figure 1D:
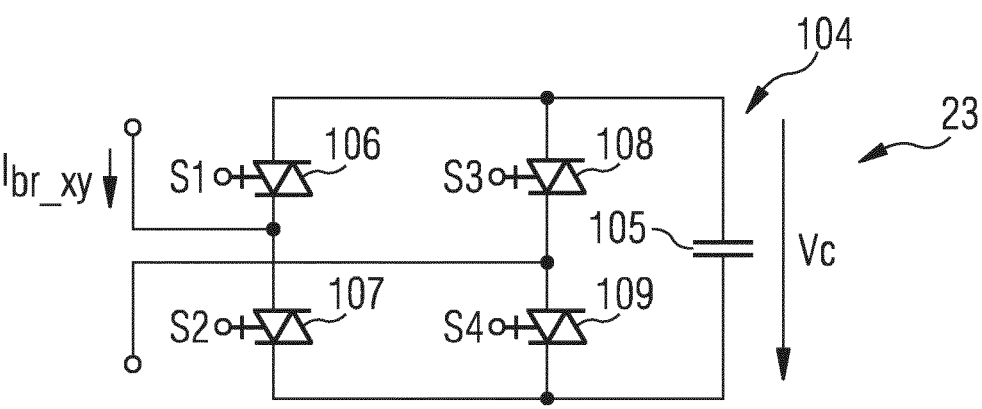

FIG. 1D shows an example of a cell 23 which is a further development of the above shown examples. A capacitor voltage Vc is provided by the cell 23. The capacitor voltage Vc may be named DC voltage. A branch current Ibr_xy flows through the cell 23. The cell 23 comprises an energy storage 104 which is typically implemented as a capacitor arrangement. The capacitor arrangement comprises at least a capacitor 105. The capacitor voltage Vc is provided by the energy storage 104. Since the energy storage 104 may be realized as a capacitor 105, the expression capacitor voltage is used in this disclosure. The cell 23 comprises a first to a fourth semiconductor switch 106 to 109 that are connected in a bridge configuration. The cell 23 is fabricated as a full-bridge cell. The first to the fourth semiconductor switch 106 to 109 may be implemented as insulated-gate bipolar transistors. The first valve control module 83 provides four cell control signals S1 to S4 to the four semiconductor switches 106 to 109. A semiconductor switch 106 can be called valve.

Figure 2A:
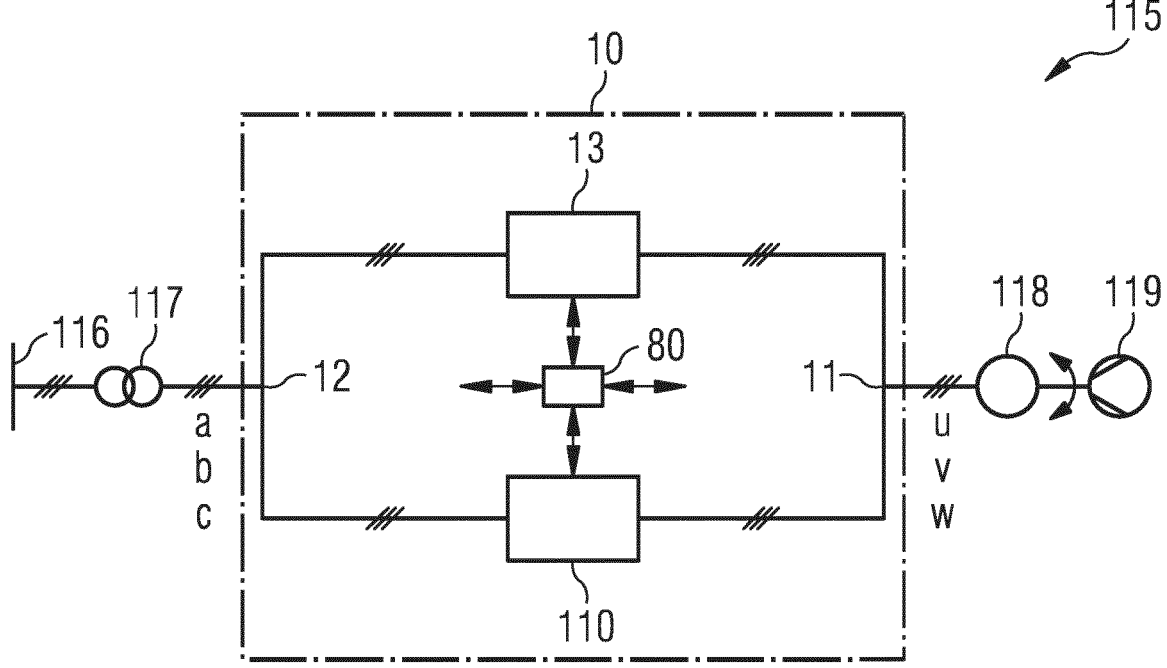
FIGS. 2A to 2D show an exemplary embodiment of an arrangement comprising a converter with two MMCs.

FIG. 2A shows an exemplary embodiment of an arrangement 115 with a converter 10 which is a further development of the above-shown embodiments. The arrangement 115 includes the converter 10. The converter 10 comprises a first number Z of MMCs 13, 110. In the example shown in FIG. 2A, the first number Z is 2. Alternatively, the first number Z may be 3, 4 and >4. The first MMC 13 is connected on a first side to the first terminal 11 and on another side to the second terminal 12. Correspondingly, a second MMC 110 is connected on a first side to the first terminal 11 and on a second side to the second terminal 12. The first number Z of MMCs 13, 110 are connected parallel. Additionally, the arrangement 115 comprises a grid 116 realized as high voltage grid. A transformer 117 of the arrangement 115 may couple the second terminal 12 to the high voltage grid 116. Furthermore, the arrangement 115 comprises a machine 118 that is connected to the first terminal 11. The machine 118 may be realized as motor. A pump or a turbine 119 is coupled via the machine 118 to the first terminal 11. As indicated in FIG. 2A, the connections or couplings are realized with three connection lines for the three phases a, b, c and u, v, w.

The goal of the parallel converter 10 is to increase the power transmission from the grid 116 to the machine 118 in pumping mode and vice versa for turbine mode. As machine voltage reaches its maximum insulation limits, a way to increase the power is to increase the current flowing in the converter 10. Because of the paralleling, the current is divided into the two converter blocks (that means two MMCs 13, 110) and the maximum semiconductor current is not reached. The control arrangement 80 implements a proper control solution so that the voltages Vc across the capacitors 105 of the two MMCs 13, 110 are balanced and an uncontrolled current that will be referred to as parallel current is reduced between the two MMCs 13, 110.

In FIG. 2A, a machine 118 or a motor is used in this particular example of a pumped hydro storage application. The further measurement signal SM may be a motor measurement signal.

Alternatively, the first terminal 11 may be connected to another three-phase grid, a single-phase railway grid or other grids. The further measurement signal SM may be a further grid measurement signal.

Figure 2B:
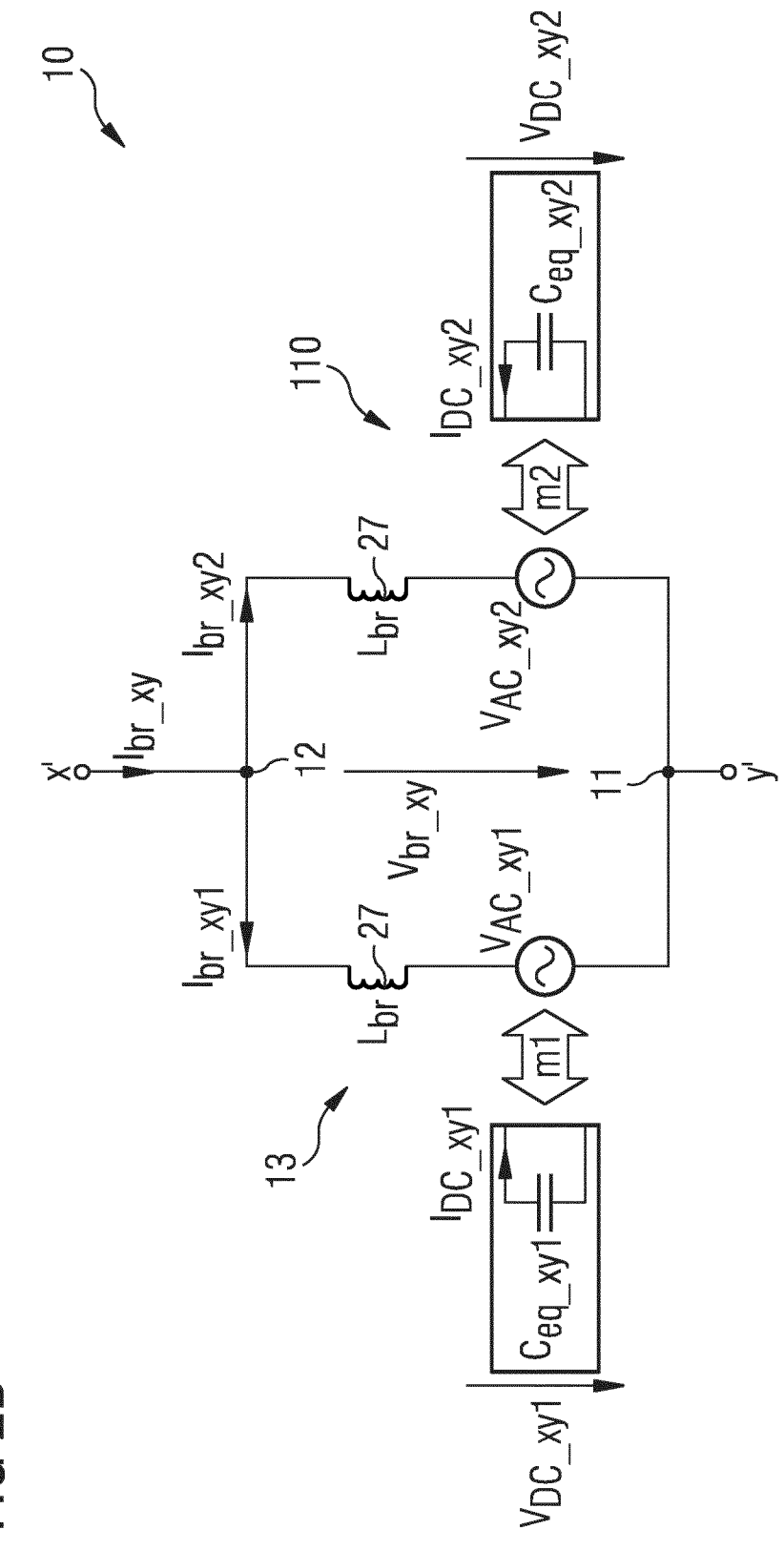

FIG. 2B shows an exemplary embodiment of an equivalent circuit of a converter 10 which is a further development of the embodiment shown above. The converter 10 includes a parallel connection of the first number Z of MMCs 13, 110. Each of the first number Z of MMCs 13, 110 may be realized as a direct MMC. In FIG. 2B, branches of parallel MMCs 13, 110 are shown. The simulations in this document were performed in an offline simulation model with a symmetrical grid 116. In a parallel MMC, there are two phase-legs in parallel as shown in FIG. 2B. The voltage source $$V_{AC_{xy}}^z$$

corresponds to the sum of the cell voltages simplified as an ideal source. The modulation references $m_z$ allows to control branch capacitor voltages $$V_{DC_{xy}}^z$$

of the converters with z={1,2} referring to the MMC (z=1 corresponds to the first MMC 13, z=2 corresponds to the second MMC 110). The branch capacitor voltages $$V_{DC_{xy}}^z$$

may be a sum of the capacitor voltages Vc of the number N of cells 23 to 25 of a branch or an average voltage of the capacitor voltages Vc of the number N of cells 23 to 25 of a branch and are measured by voltage detectors and converted into the branch capacitor voltage signals Vavg_1, Vavg_2.

Because of the paralleling current, the branch currents $$I_{br_{xy}}^z$$

do not necessarily have the same value. The branch currents $$I_{br_{xy}}^z$$

of each converter z={1,2}, connected to the grid phase x={a,b,c} and motor phase y={u,v,w} can be defined as $$I_{br_{xy}}^1 = \frac{I_{br_{xy}}}{2} + I_{par_{xy}} \qquad (1)$$

-continued $$I_{br_{xy}}^2 = \frac{I_{br_{xy}}}{2} - I_{par_{xy}}$$

with $I_{par_{xy}}$ the current flowing between the branches connected to the same grid and motor phase. Equivalently, the parallel current between the branches is equal to $$I_{par_{xy}} = \frac{I_{br_{xy}}^1 - I_{br_{xy}}^2}{2}. \qquad (2)$$

The difference $$V_{DC_{xy}}^\Delta$$

of the branch capacitor voltages $$V_{DC_{xy}}^z$$

between the MMCs 13, 110 is defined as $$V_{DC_{xy}}^\Delta = V_{DC_{xy}}^1 - V_{DC_{xy}}^2. \qquad (3)$$

Moreover, one can define the average or equivalently the common-mode current of the MMCs 13, 110 by performing two Clarke transformations as $$I_{br_{xy}}^z \xrightarrow{\alpha\beta\,grid} I_{br_{0y}}^z \xrightarrow{\alpha\beta\,motor} I_{br_{00}}^z \qquad (4)$$

and on average, the parallel current is such that $$\frac{I_{br_{00}}^1 - I_{br_{00}}^2}{2} = I_{par}. \qquad (5)$$

The branch capacitor voltages $V_{DC_{xy}}{}^z$ of the MMCs 13, 110 are transformed as $$V_{DC_{xy}}^z \xrightarrow{\alpha\beta\,grid} V_{DC_{0y}}^z \xrightarrow{\alpha\beta\,motor} V_{DC_{00}}^z \qquad (6)$$

to derive their average. Also the difference of the average capacitor voltage can be computed, i.e.:

$$V_{DC_{00}}^1 - V_{DC_{00}}^2 = V_{DC_{00}}^\Delta \qquad (7)$$

Figure 2C:
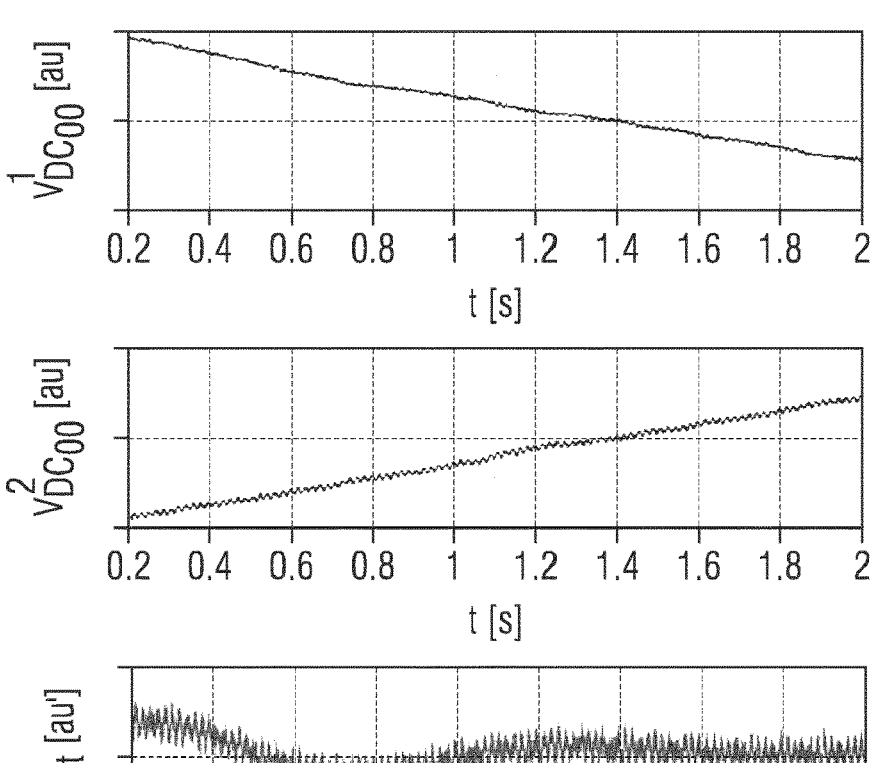

FIG. 2C shows an example of characteristics of the converter 10 of FIGS. 2A and 2B. An average capacitor voltage $$V_{DC_{00}}^1, V_{DC_{00}}^2$$

of the first and the second MMC 13, 110 and a total average capacitor voltage VDCt are shown as a function of a time t. The voltages are shown in arbitrary units au, au'. In order to understand the issue of the parallel MMCs 13, 110, a scenario is simulated with a controller or control arrangement 80 per MMC that balances its own MMC but without control loop between the two MMCs. In one of the MMCs, the branch inductance 27 in three branches connected to one of the grid phases is modified to be 30% lower than the others in order to create an unbalance. This exaggerated scenario quickly shows abnormal behavior in the simulation. Indeed, as depicted in FIG. 2C, the average capacitor voltage of each of the two converters $$V^z_{DC_{00}}$$

diverges with time while the total average capacitor voltage VDCt remains the same in both MMCs 13, 110. Thus, the protection system will trip to prevent damages of the converter 10.

Figure 2D:
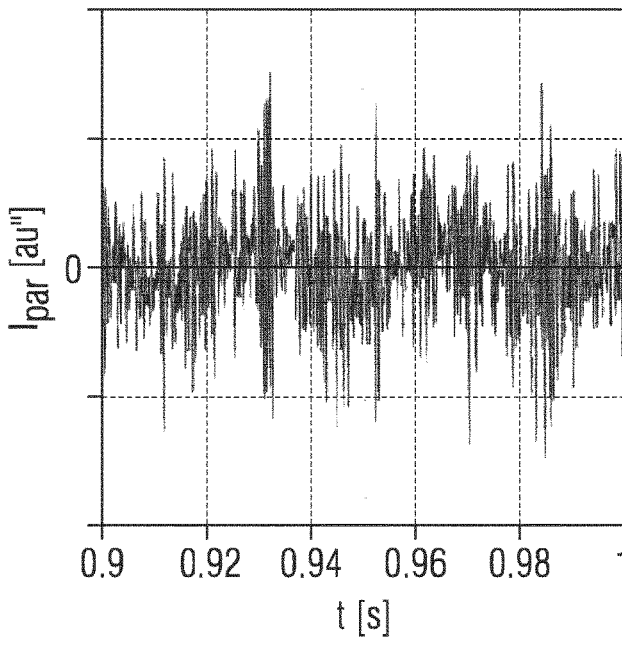
Figure 6:
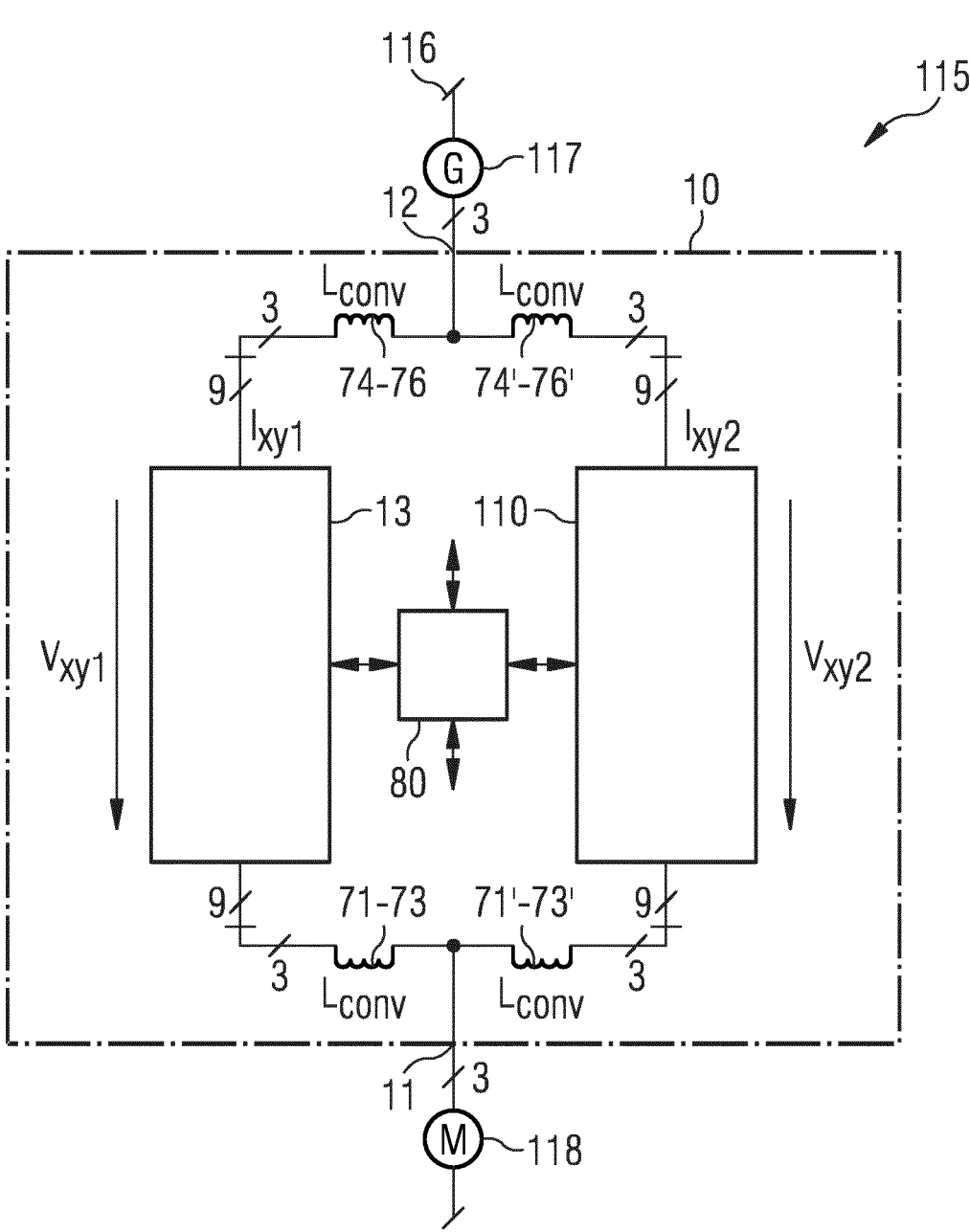

FIG. 2D shows an example of a characteristic of the converter 10, e.g., as elucidated by FIGS. 2A to 2C. A parallel current Ipar is shown as a function of the time t. The current is shown in an arbitrary unit au". By plotting Ipar as in FIG. 2D, two components are observed. The first one is a DC voltage around zero, which should be eliminated by the control, and the second one is a high frequency coming from the desynchronization of the switches or equivalently the modulation. If the inductance components do not have the same value, a current flows between the parallel branches as the number of switches being ON are not the same temporarily. This issue cannot be eliminated with a control loop, but the peaks can be mitigated by modifying the converter hardware (e.g., as shown in FIG. 6).

Figure 3A:
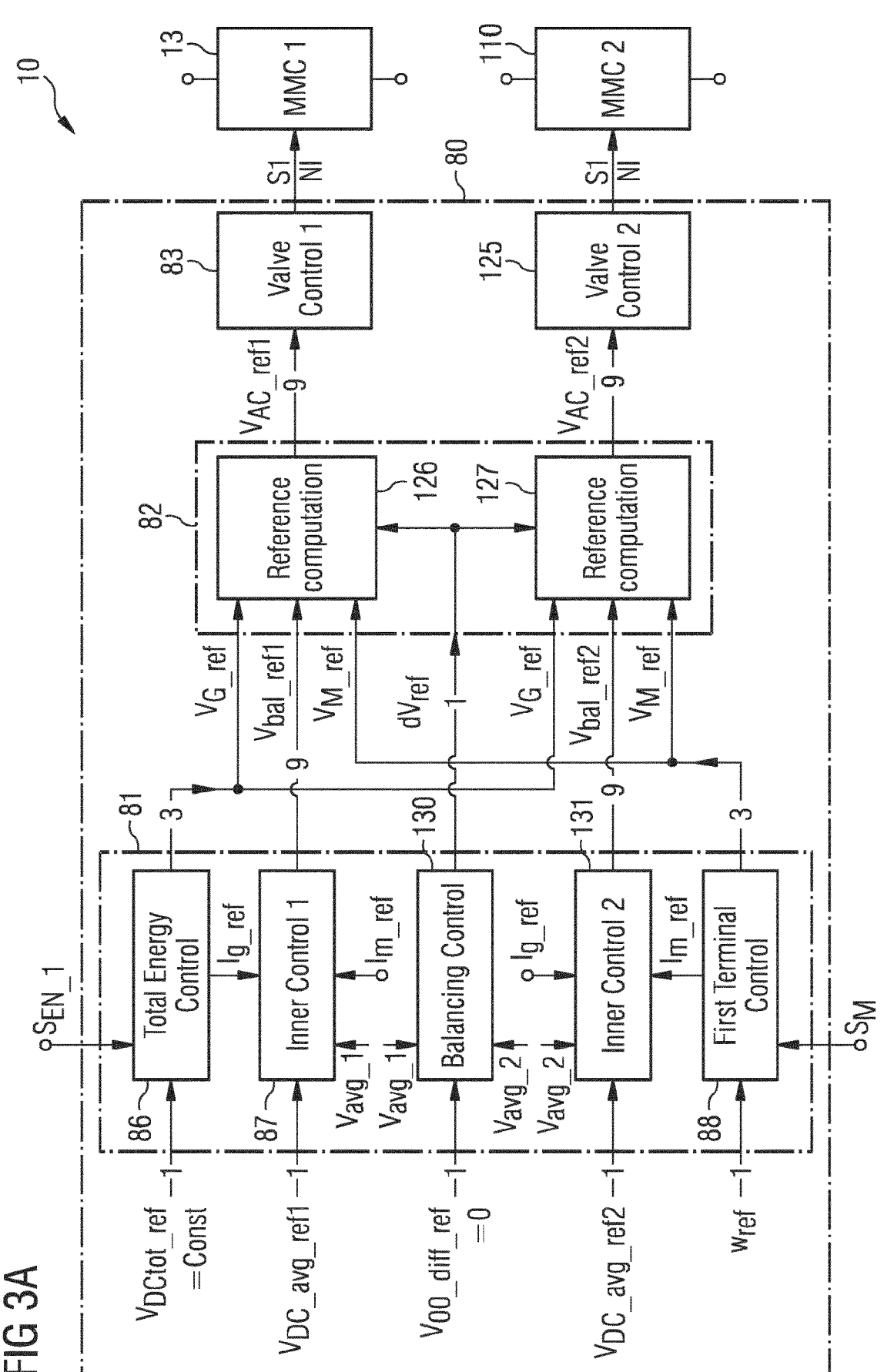

FIG. 3A shows an exemplary embodiment of a converter 10 which is a further development of the embodiments shown above. The converter 10 includes the first number Z of MMCs 13, 110 and the control arrangement 80 that is connected to each of the first number Z of MMCs 13, 110. The control concept of the parallel MMCs 13, 110 uses the same basis as for a single MMC 13 as shown in FIGS. 1B and 1C and extends it to balance two MMCs 13, 110. In FIG. 3A, a first method variant named converter-based control is illustrated. This method proposes to use the same inner control as the single MMC 13 but duplicates them as shown in FIG. 3A.

The control arrangement 80 comprises a first number Z of valve control modules 83, 125 which are connected on their output sides to the first number Z of MMCs 13, 110. Thus, one valve control module of the first number Z of valve control modules 83, 125 provides cell control signals S1 to S4 to one MMC of the first number Z of MMCs 13, 110. The reference computation module 82 comprises a first number Z of reference computation blocks 126, 127 that are coupled on their output side to the first number Z of valve control modules 83, 125. Thus, one of the first number Z of reference computation blocks 126, 127 provides branch control signals VAC_ref to one of the first number Z of valve control modules 83, 125.

The control module 81 additionally comprises a balancing control block 130 that is coupled on its output side to each of the reference computation blocks 126, 127. The balancing control block 130 generates a balancing signal dVref and provides it to each of the reference computation blocks 126, 127. The balancing signal dVref may include a first number Z of partial balancing signals dVref1, dVref2. The sum of the first number Z of partial balancing signals dVref1, dVref2 is zero. Moreover, the control module 81 comprises a first number Z of inner control blocks 87, 131. One of the first number Z of inner control blocks 87, 131 is coupled on its output side to one of the first number Z of reference computation blocks 126, 127.

The first total energy control block 86 is connected to each of the first number Z of inner control blocks 87, 131 for providing the output signal Ig_ref and to each of the reference computation blocks 126, 127 for providing the first voltage reference signal VG_ref. Correspondingly, the first terminal control block 88 is coupled on its output side to each of the first number Z of inner control blocks 87, 131 for providing the output signal Im_ref and to each of the first number Z of reference computation blocks 126, 127 for providing the second voltage reference signal VM_ref.

The first total energy control block 86 has the DC voltage reference VDCtot_ref as an input. The first terminal control block 88 has the first terminal reference wref as an input. The first number Z of inner control blocks 87, 131 have a first number Z of average DC voltage references VDC_avg_ref1, VDC_avg_ref2 as an input. The balancing control block 130 has as an input a reference V00_diff_ref that has the value of 0. These references may be provided by an external source such as a system computer (not shown) or can be predetermined values stored as fixed values in registers of the control arrangement 80, e.g., inside the respective blocks.

Figure 5:
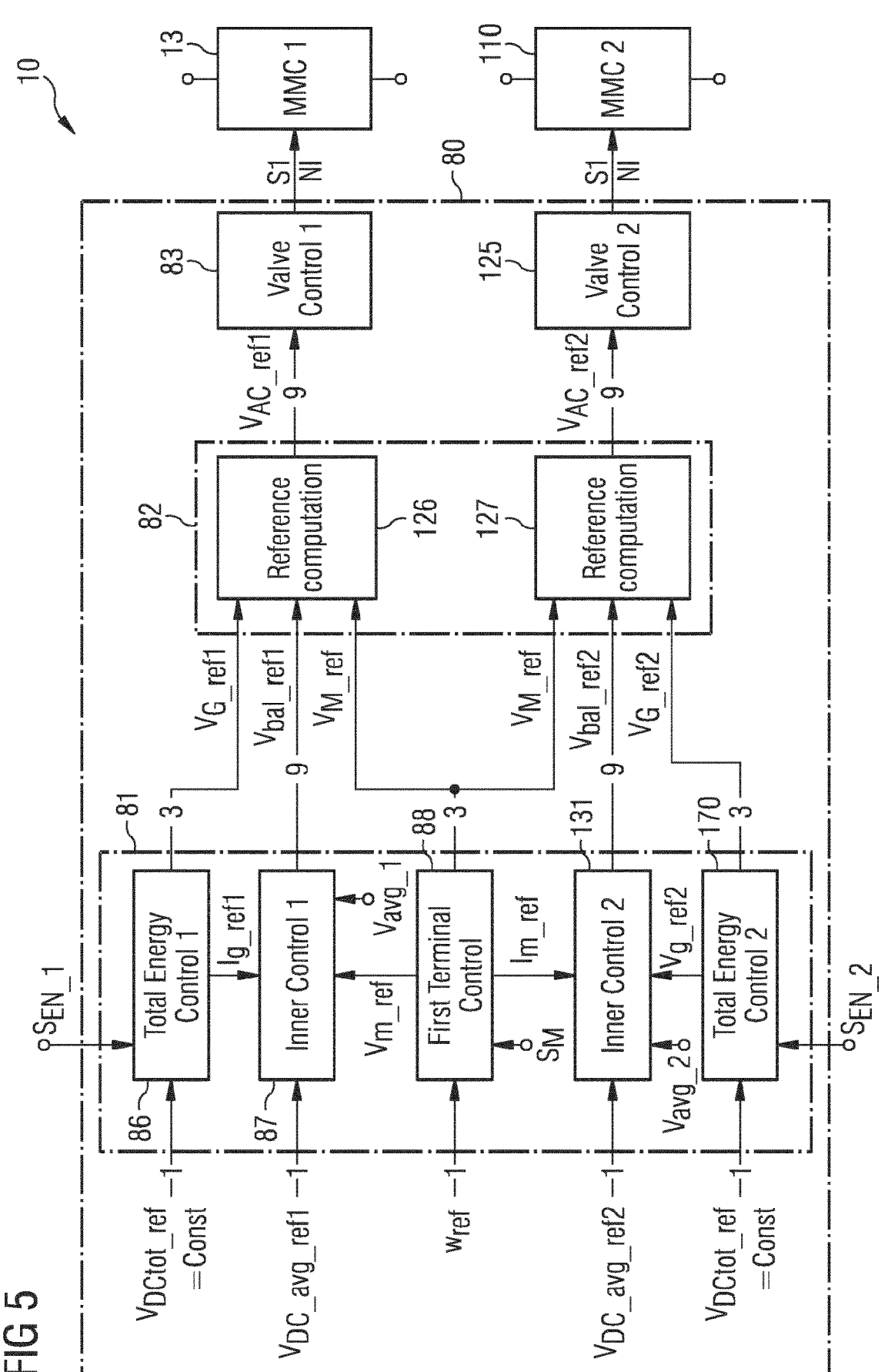

The at least an average DC voltage reference VDC_avg_ref includes or is implemented by a first number Z of average DC voltage references VDC_avg_ref1, VDC_avg_ref2 (as shown, e.g., in FIGS. 3A and 5). One of the first number Z of the average DC voltage references VDC_avg_ref1, VDC_avg_ref2 is a function of the detected capacitor voltages Vc of the capacitors 105 of the cells 23 of each branch 14 to 22 of one of the first number Z of modular-multilevel converters 13, 110. Thus, each of the first number Z of modular-multilevel converters 13, 110 is controlled using its own average DC voltage reference VDC_avg_ref1, VDC_avg_ref2. The values of the average DC voltage reference VDC_avg_ref1, VDC_avg_ref2 may be different.

The average DC voltage reference VDC_avg_ref1 can be calculated using the equation:

$$V_{DC\_avg\_ref1} = \frac{1}{9}\sum_{x,y,n} V^{z=1}_{DC_{xyn}},$$

wherein $$V^{z=1}_{DC_{xyn}}$$

are the detected or measured capacitor voltages of the capacitors 105 of the cells 23 of each branch 14 to 22 of the first MMC 13. The index z indicates the number of the MMC of the first number Z of MMC 13, 110. The average DC voltage reference VDC_avg_ref1 is a function of the detected capacitor voltages Vc or $$V^{z=1}_{DC_{xyn}}$$

of the capacitors 105 of the cells 23 of each branch 14 to 22 of the first MMC 13.

Correspondingly, the average DC voltage reference VDC_avg_ref2 can be calculated using the equation:

$$V_{DC\_avg\_ref2} = \frac{1}{9}\sum_{k,y,n} V_{DC_{xyn}}^{z=2},$$

wherein $$V_{DC_{xyn}}^{z=2}$$

are the detected or measured capacitor voltages of the capacitors 105 of the cells 23 of each branch 14 to 22 of the second MMC 110. Thus, the index z equals 2. The average DC voltage reference VDC_avg_ref2 is a function of the detected capacitor voltages Vc or $$V_{DC_{xyn}}^{z=2}$$

of the capacitors 105 of the cells 23 of each branch of the second MMC 110.

The first number Z of inner control blocks 87, 131 provides a first number Z of inner voltage reference signals Vbal_ref1, Vbal_ref2 as a function of the first number Z of average DC voltage references VDC_avg_ref1, VDC_avg_ref2 and measurement signals named branch capacitor voltage signals Vavg_1, Vavg_2. A first branch capacitor voltage signal Vavg_1 includes a number M of measurement values, each value representing a sum or an average of the capacitor voltages Vc of a branch of the first MMC 13. Similarly, a second branch capacitor voltage signal Vavg_2 includes a number M of measurement values, each value representing a sum or an average of the capacitor voltages Vc of a branch of the second MMC 110. The branch capacitor voltage signals Vavg_1, Vavg_2 are also applied to the balancing control block 130.

The MMCs of the first number Z of MMCs 13, 110 are controlled independently from each other by signals generated via the chain of a corresponding inner control block 87, 131, a reference computation block 126, 127 and a valve control module 83, 125. The first total energy control block 86 and the first terminal control block 88 generate signals which have an influence on each of the chains. The balancing control block 130 is realized to generate the balancing signal dVref for balancing the first number Z of chains which separately control the MMCs of the first number Z of MMCs 13, 110.

For the inner control, the MMCs 13, 110 are assumed to be independent and in addition, a balancing control loop makes sure that the average capacitor voltages $$V_{DC_{00}}^1, V_{DC_{00}}^2$$

of both MMCs 13, 110 are equal and that the current between the MMCs 13, 110 is minimized. The overall control strategy is illustrated in FIG. 3A. As each inner control takes care of balancing the capacitor voltages Vc within their MMC, one single control loop is added to control the average capacitor voltage difference $$V_{DC_{00}}^\Delta$$

(equation (7)) to zero. Compared to the single MMC 13, the branch current contains the parallel current $I_{par}$ according to equation (5), namely $$I_{br_{xy}}^1 = \frac{I_{gx}}{6} - \frac{I_{my}}{6} + I_{circ_{xy}} + I_{par}, \tag{8}$$

$$I_{br_{xy}}^2 = \frac{I_{gx}}{6} - \frac{I_{my}}{6} + I_{circ_{xy}} - I_{par}.$$

The parallel current $I_{par}$ is used to balance the capacitors 105 and is mitigated in the steady state. By computing the common-mode or the average of the voltage, one can derive an equivalent plant for the L and C circuit as $$C_{eq}\frac{dV_{DC_{00}}^\Delta}{dt} = I_{DC_{00}}^\Delta \tag{9}$$

$$V_{AC_{00}}^\Delta = -L_{br}\frac{dI_{br_{00}}^\Delta}{dt}$$

with $$I_{br00}^\Delta = I_{br_{00}}^1 - I_{br_{00}}^2 = 2I_{par}.$$

The voltage reference of each phase-leg $$V_{AC_{xy}}^{z*}$$

is computed such that $$V_{AC_{xy}}^{z*} = V_{AC_{g_x}}^{z*} - V_{ACm_{xy}}^{z*} - V_{ACbal_{xy}}^{z*} - \Delta V_{00}^{z*} \tag{10}$$

with $$V_{AC_{g_x}}^{z*}$$

the reference of the total energy controller, $$V_{ACm_y}^{z*}$$

the reference of the motor controller, $$V_{ACbal_{xy}}^{z*}$$

the reference of the inner controller and $$\Delta V_{00}^{z*}$$

the reference of the balancing controller.

Using the symbols shown in FIG. 3A, in case of the first number Z being 2, the branch control signals VAC_ref1, VAC_ref1 for the first and the second MMC 13, 110 are calculated according to the equations:

VAC_ref1=VG_ref−VM_ref−Vbal_ref1−dVref1

VAC_ref2=VG_ref−VM_ref−Vbal_ref2−dVref2 with dVref2=−dVref1 wherein VG_ref is the first voltage reference signal, VM_ref is the second voltage reference signal, Vbal_ref1, Vbal_ref2 are inner voltage reference signals and dVref1, dVref2 are balancing signals.

The control arrangement 80 may comprise one or more than one microprocessors or microcontrollers. For example, the control module 81 and the reference computation module 82 may be implemented by a microcontroller or microprocessor. The first and the second valve control module 83, 125 may be realized by two further microcontrollers or microprocessors. The control arrangement 80 may include one or more than one field-programmable gate arrays, abbreviated FPGA. Thus, the modules and blocks of the control arrangement 80 are realized by at least one microcontroller or microprocessor using a computer program or several software parts forming the computer program and/or are realized by hardware performing logical operations and/or analog signal processing steps.

The measurements of the capacitor voltage Vc, other voltages, currents and other signals are performed by conventional sensors and detectors (not shown) used in the field of power conversion systems. The sensors and detectors couple the MMCs 13, 110 to the control arrangement 80.

Figure 3B:
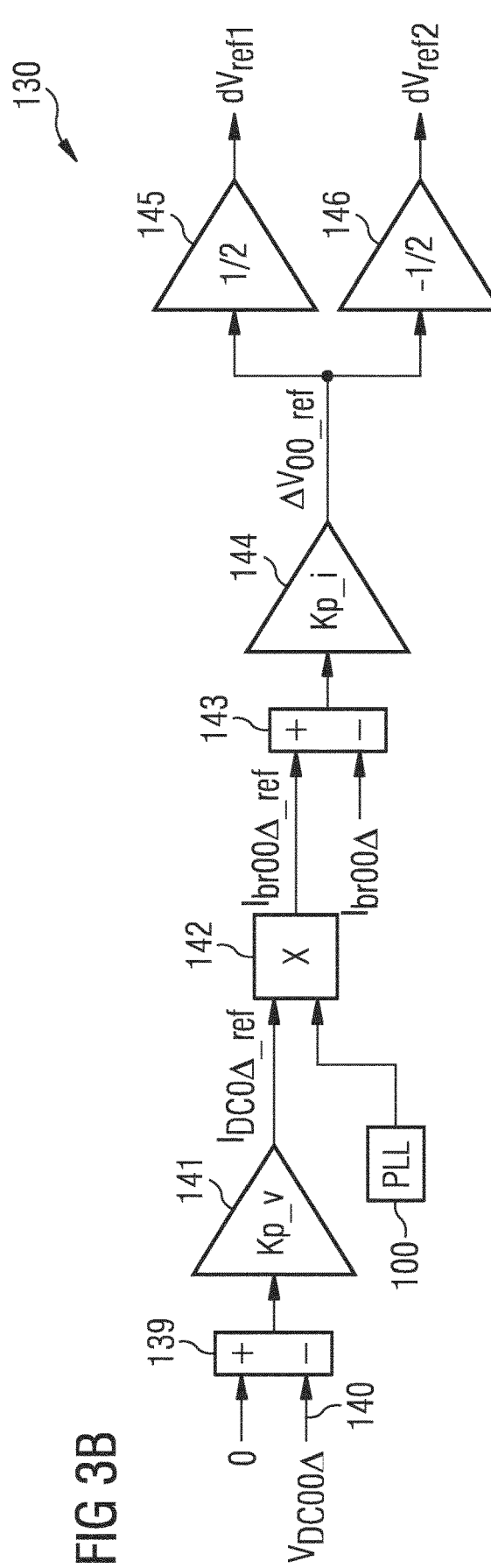

FIG. 3B shows an exemplary embodiment of a balancing control block 130 which is a further development of the embodiment shown in FIG. 3A. The balancing control block 130 realizes a balancing control loop. The balancing control block 130 includes an error calculator 139. The error calculator 139 compares a reference which has the value 0 with a measurement signal VDC00Δ which represent measurement results gained at the first number Z of MMCs 13, 110. The measurement signal VDC00Δ represents a difference between the average capacitor voltages $$V_{DC_{00}}^1, V_{DC_{00}}^2$$

of the first and the second MMC 13, 110. The measurement signal VDC00Δ can be calculated using the branch capacitor voltage signals Vavg_1, Vavg_2. An output signal of the error calculator 139 is provided via a first amplifier 141 to a multiplier 142. A further signal is applied to the multiplier 142 which is generated by the phase locked loop 100. An output signal of the multiplier 142 is provided to a first input of a further error calculator 143. The further error calculator 143 has a second input to which measurement signals are provided which are achieved with a first number Z of MMCs and represent a difference of a branch current $$I_{br_{xy}}^z$$

of the first MMC 13 to the second MMC 110. An output signal of the further error calculator 143 is applied via a second amplifier 144 to a third and a fourth amplifier 145, 146. The amplification factors of the third and fourth amplifier 145, 146 have opposite signs; the absolute value of the amplification factors of the third and fourth amplifier 145, 146 are identical. Thus, for example the amplification factor of the third amplifier 145 is 0.5 and the amplification factor of the fourth amplifier 146 is −0.5.

The third and the fourth amplifier 145, 146 provide two balancing signals dVref1, dVref2 which are provided to the first and the second reference computation block 126, 127. Thus, the sign and the amount of the balancing signal dVref1 provided to the first reference computation block 126 depends on the measured difference in the average capacitor voltages. The sign of the balancing signal dVref1 is opposite to the sign of the balancing signal dVref2 provided to the second reference computation block 127. The absolute values of the two balancing signals dVref1, dVref2 are identical. Advantageously, the first and the second MMC 13, 110 are controlled such that the average capacitor voltages $$V_{DC_{00}}^1, V_{DC_{00}}^2$$

are the same. In the case that the first number Z is higher than 2, the balancing control block 130 is realized in a similar way and generates a first number Z of balancing signal dVref1, dVref2.

Figure 3C:
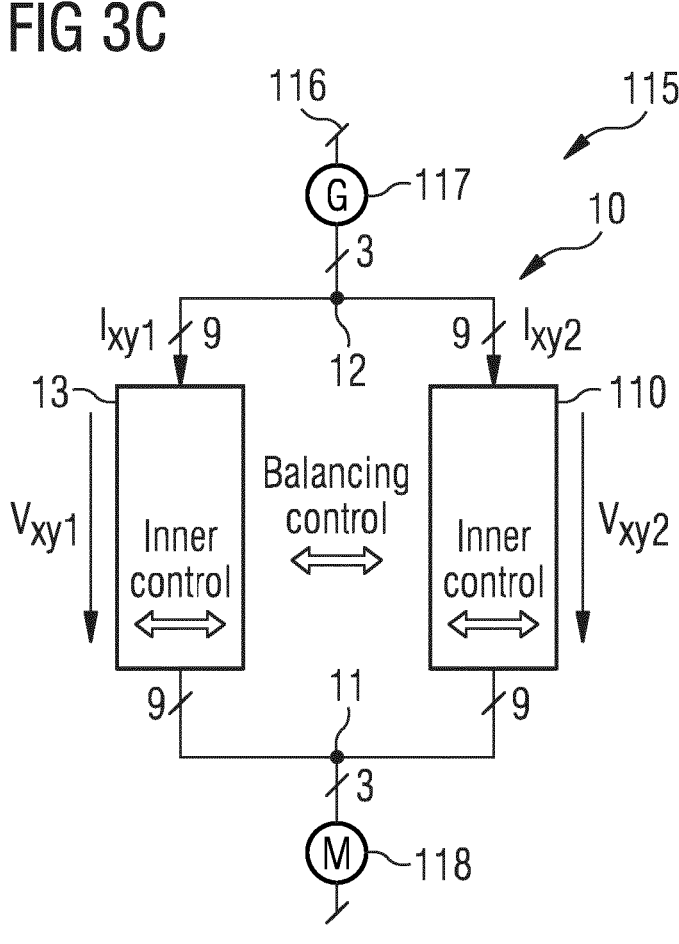

FIG. 3C shows an exemplary embodiment of an arrangement 115 with a converter 10 which is a further development of the above-shown embodiments. The numbers 3 and 9 indicate that the connections are realized using three or nine parallel connection lines.

Figure 3D:
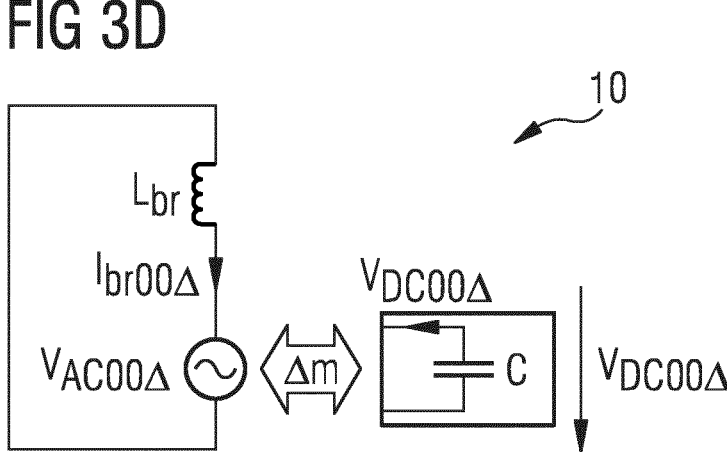

FIG. 3D shows an exemplary embodiment of an equivalent circuit of a converter 10—namely of the control based balancing variant of the method—which is a further development of the above-shown embodiments.

Figure 4A:
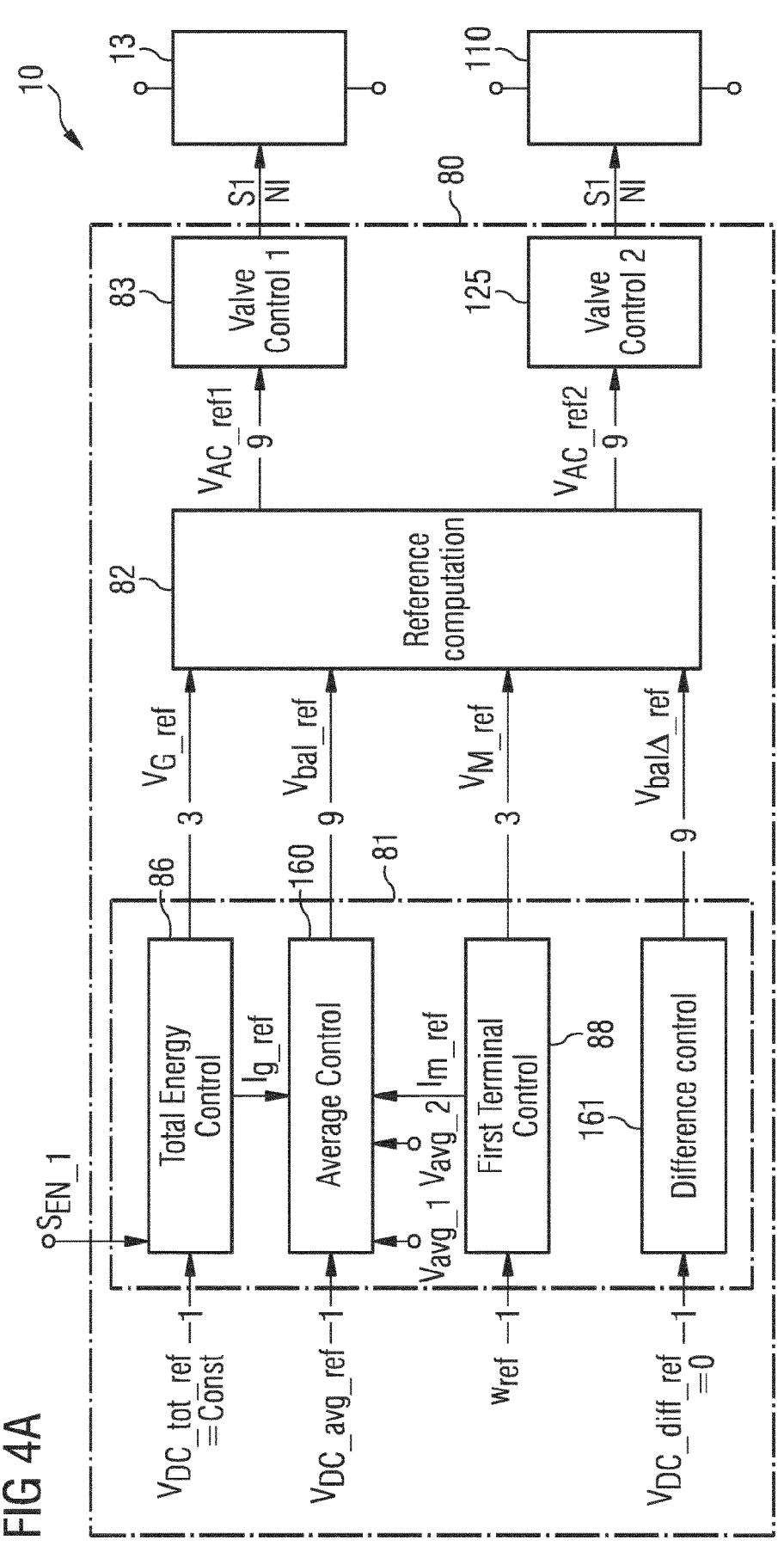

FIG. 4A shows an alternative exemplary embodiment of a converter 10 which is a further development of the embodiments shown above. The converter 10 uses a branch based variant of the method. The overall strategy is depicted in FIG. 4A and the balancing control using the new reference frame is presented more into details in FIG. 4B.

As shown in FIG. 4A, the reference computation module 82 provides the signals for the first number Z of valve control modules 83, 125. The reference computation module 82 is not split into several reference computation blocks as shown in FIGS. 3A and 5. The first total energy control block 86 and the first terminal control block 88 provide the first voltage reference signal VG_ref and the second voltage reference signal VM_ref to the reference computation module 82. The control module 81 comprises an average control block 160 which has the average DC voltage reference VDC_avg_ref as an input. Moreover, the first terminal control block 88 and the first total energy control block 86 provide their output signals Ig_ref, Im_ref to the average control block 160.

The average control block 160 generates the inner voltage reference signal Vbal_ref to the reference computation module 82. The inner voltage reference signal Vbal_ref may also be called a sum balance signal VbalΣ_ref. The sum balance signal is special implementation of the inner voltage reference signal Vbal_ref. In FIG. 4A, the first inner control block 87 of FIGS. 1B, 3A and 5 is replaced by the average control block 160 that has a corresponding functionality. The average control block 160 receives the same or similar inputs than the first and the second inner control block 87, 131 and performs similar operations.

Furthermore, the control module 81 comprises a difference control block 161. The difference control block 161 has a reference signal VDC_diff_ref as an input which is zero. The difference control block 161 provides a difference balance signal VbalΔ_ref to the reference computation module 82.

Using the symbols shown in FIG. 4A, in case of the first number Z being 2, the branch control signals VAC_ref1, VAC_ref1 for the first and the second MMC 13, 110 are calculated by the reference computation module 82 according to the equations:

VAC_ref1=VG_ref−VM_ref−Vbal_ref−VbalΔ_ref

VAC_ref2=VG_ref−VM_ref−Vbal_ref−VbalΔ_ref wherein VG_ref is the first voltage reference signal, VM_ref is the second voltage reference signal, Vbal_ref is the inner voltage reference signal and VbalΔ_ref is the difference balance signals. The inner voltage reference signal Vbal_ref and the difference balance signals VbalΔ_ref may both include partial signals, e.g., for each arrangement of parallel connected branches or for each of the branches. In case Z=2, a branch of the first MMC13 and a branch of the second MMC 110 are connected parallel and form a pair. The number of branches 14 to 22 is the first number Z of MMCs times the number M of branches pro MMC. In the example, the number of branches is 18 and the number of pairs of parallel connected branches is 9. Each MMC of the first number Z of MMCs 13, 110 has the identical number M of branches.

The second variant of the method considers only one MMC with 9 parallel phase branches as presented in FIG. 2B. The topology is the same, but the control strategy is different. In order to have a fully decoupled control, the average/difference of the capacitor voltage $$V^z_{DC_{xyn}}$$

(written above as Vc) is regulated to verify the equations:

$$V^{\Sigma*}_{DC_{xy}} = \frac{V^1_{DC_{xy}} + V^2_{DC_{xy}}}{2} = \frac{1}{18} \sum_{x,y,z,n} V^Z_{DC_{xyn}} \qquad (11)$$

and $$V^{\Delta*}_{DC_{xy}} = V^1_{DC_{xy}} - V^2_{DC_{xy}} = 0. \qquad (12)$$

To achieve this purpose, a new reference frame for the voltage and the current control is introduced. The absolute values of the branch capacitor voltage/currents are transformed into their average/difference values as:

$$V^{\Sigma\Delta}_{DC_{xy}} = \begin{pmatrix} V^\Sigma_{DC_{xy}} \\ V^\Delta_{DC_{xy}} \end{pmatrix} = \begin{pmatrix} 1/2 & 1/2 \\ 1 & -1 \end{pmatrix} \begin{pmatrix} V^1_{DC_{xy}} \\ V^2_{DC_{xy}} \end{pmatrix} = T_v V^{12}_{DC_{xy}} \qquad (13)$$

$$I^{\Sigma\Delta}_{br} = \begin{pmatrix} I^\Sigma_{br_{xy}} \\ I^\Delta_{br_{xy}} \end{pmatrix} = \begin{pmatrix} 1 & 1 \\ \frac{1}{2} & -\frac{1}{2} \end{pmatrix} \begin{pmatrix} I^1_{br_{xy}} \\ I^2_{br_{xy}} \end{pmatrix} = T_i I^{12}_{br_{xy}}.$$

In this case $$I^\Delta_{br_{xy}}$$

is equal to $I_{par_{xy}}$.

The difference Vbal_ref−VbalΔ_ref can already be calculated per each branch, e.g., by the average control block 160. Then, in contrary to the converter-based method, only three components are added together instead of four to compute the branch control signals VAC_ref and there is only one term for the balancing, namely:

$$V^{z*}_{AC_{xy}} = V^*_{ACg_x} - V^*_{ACm_y} + V^{z*}_{ACbal_{xy}} \qquad (14)$$

with $$V^{z*}_{ACbal_{xy}}$$

the balancing component (which is equal to Vbal_ref−VbalΔ_ref).

Figure 4B:
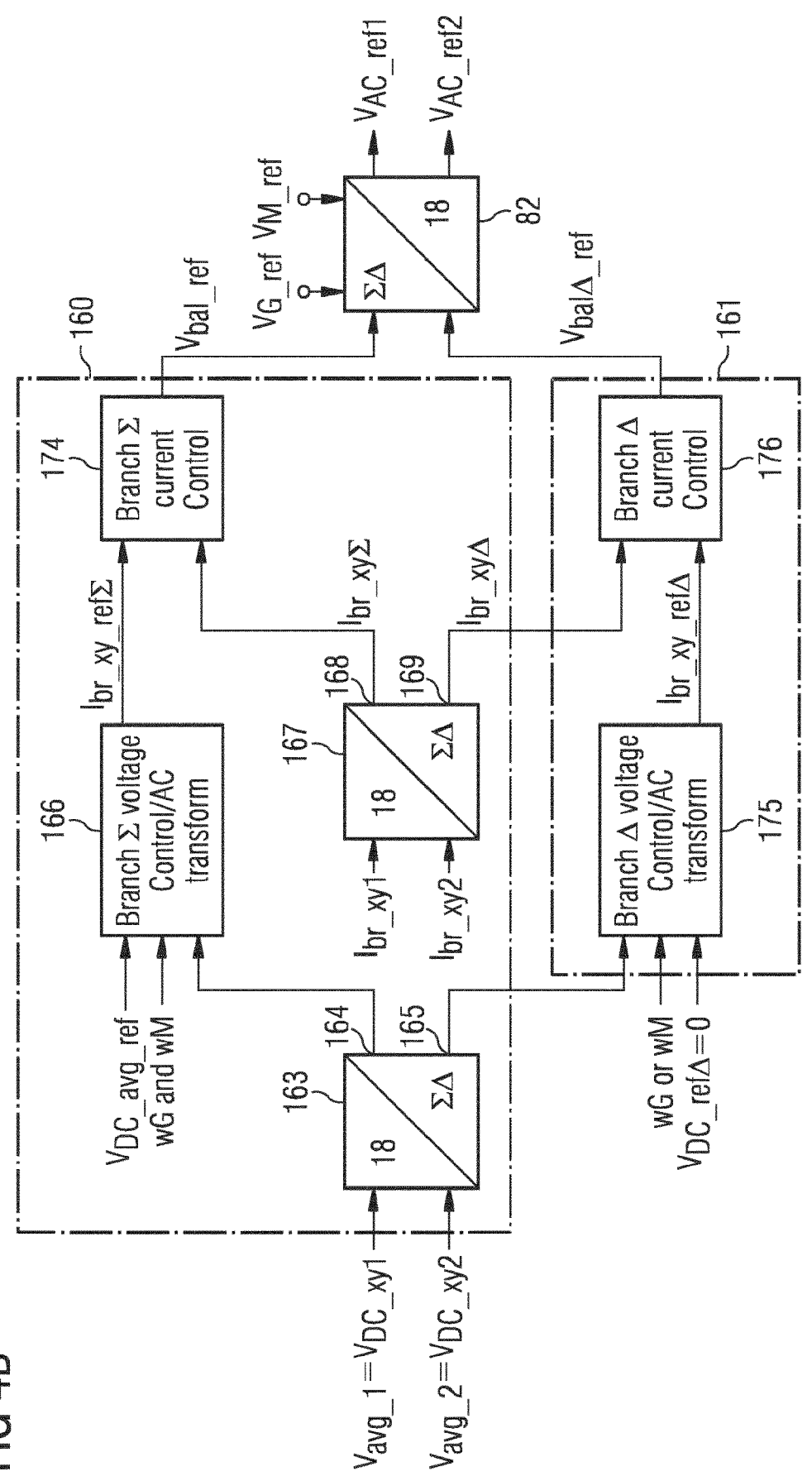

FIG. 4B shows an exemplary embodiment of an average control block 160 and a difference control block 161 which is a further development of the embodiments shown in FIG. 4A. The average control block 160 comprises a voltage evaluation block 163 to which the branch capacitor voltage signals Vavg_1, Vavg_2 gained at the first number Z of MMCs are provided. For example, the branch capacitor voltage signals Vavg_1, Vavg_2 include signals VDC_xy1, VDC_xy2 representing the average of the capacitor voltages Vc of each of the number M of branches of the first number Z of MMCs. In the symbols VDC_xy1 and VDC_xy2, x stands for one of the phases a, b, c and y stands for one of the phases u, v, w; moreover, 1 indicates the first MMC 13 and 2 indicates the second MMC 110. Alternatively, the symbols VDCxy1, VDCxy2 represent the sum of the capacitor voltages of each of the number M of branches of the first number Z of MMCs. In the example, VDCxy1 includes nine measurements signals of the first MMC 13 and VDCxy2 includes nine measurements signals of the second MMC 110.

The voltage evaluation block 163 provides signals indicating the sum of the input voltage signals at a first output 164 and signals indicating differences between the input signals at a second output 165. The average control block 160 comprises a first evaluation block 166 configured for the control of the summation voltage signals of the different branches and to provide an AC transformation. The first evaluation block 166 receives as an input the signals provided by the voltage evaluation block 163 indicating the sums of the voltage signals and the average DC voltage reference VDC_avg_ref. Moreover, the first evaluation block 166 receives as an input the rotation speed wG of the grid 116 and the rotation speed wM of the motor 118.

A current evaluation block 167 is included in the average control block 160 and receives measurement signals representing branch currents Ibr_xy1, Ibr_xy2 of each branch of each MMC. The current evaluation block 167 generates signals indicating the sum of currents at a first output 168 and signals indicating the difference between the currents at a second output 169. The average control block 160 comprises a second evaluation block 174 receiving as an input signals provided by the first evaluation block 166 and the signals indicating the sum of currents provided at the first output 168 of the current evaluation block 167. The second evaluation block 174 is configured for the control of the summed up current of the different branches and provides the inner voltage reference signals Vbal_ref that are applied to the reference computation module 82.

The difference control block 161 comprises a third evaluation block 175 having as an input signals indicating a difference between the voltage signals which are provided at the second output 165 of the voltage evaluation block 163 and a further signal. The further signal can either be the rotation speed wG of the grid 116 or the rotation speed wM of the motor 118 or both. The third evaluation block 175 has the effect that the differences of the DC voltage signals Vdc_xy are equal to zero. The third evaluation block 175 generates signals which are provided to a fourth evaluation block 176 of the difference control block 161. Additionally, signals indicating the differences of the branch currents Ibr_xy1, Ibr_xy2 provided at the second output 169 of the current evaluation block 167 are provided to the fourth evaluation block 176. The fourth evaluation block 176 generates the difference balance signal VbalΔ_ref to the reference computation module 82.

Figure 4C:
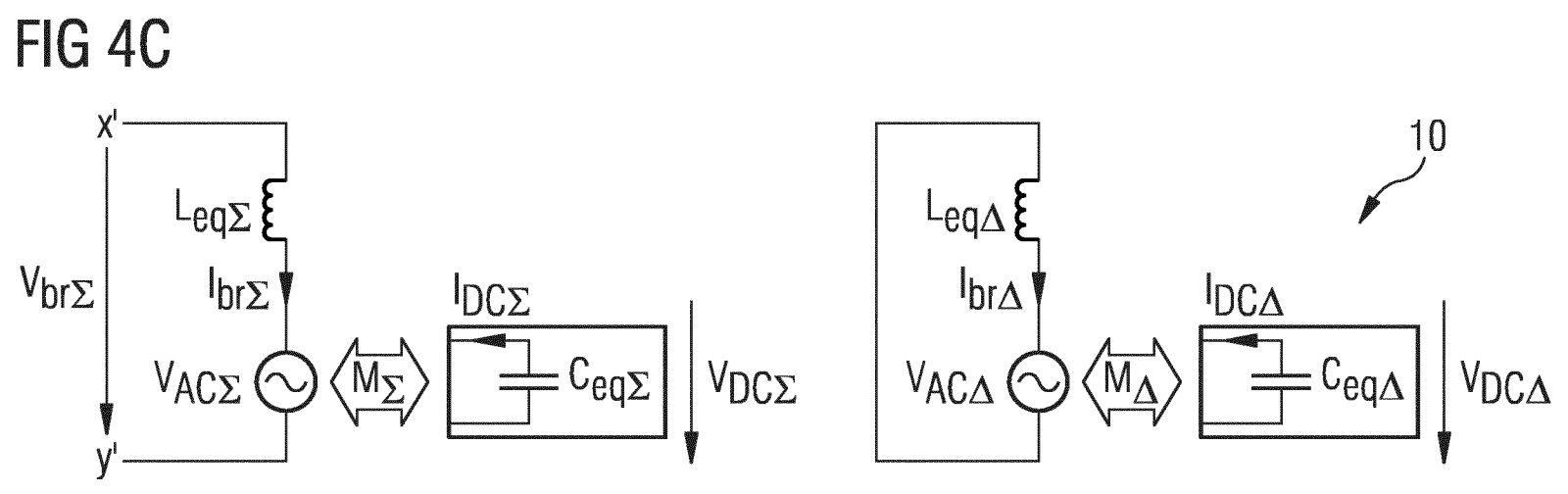

FIG. 4C shows an equivalent circuit of the converter 10 of FIGS. 4A and 4B. In the new reference frame, one can draw two new equivalent circuits as depicted in FIG. 4C. In the equivalent circuit and by deriving the plant behavior in the new reference frame, one finds that:

$$V_{DC}^{\Sigma\Delta} = \begin{pmatrix} V_{DC}^{\Sigma} \\ V_{DC}^{\Delta} \end{pmatrix} = T_v \begin{pmatrix} \frac{1}{C_{br}} & 0 \\ 0 & \frac{1}{C_{br}} \end{pmatrix} T_i^{-1} \begin{pmatrix} I_{DC}^{\Sigma} \\ I_{DC}^{\Delta} \end{pmatrix} = \begin{pmatrix} \frac{2}{2C_{br}} & 0 \\ 0 & \frac{2}{C_{br}} \end{pmatrix} \begin{pmatrix} I_{DC}^{\Sigma} \\ I_{DC}^{\Delta} \end{pmatrix} \tag{15}$$

and $$I_{br}^{\Sigma\Delta} = \begin{pmatrix} I_{br}^{\Sigma} \\ I_{br}^{\Delta} \end{pmatrix} = T_i \begin{pmatrix} \frac{1}{L_{br}} & 0 \\ 0 & \frac{1}{L_{br}} \end{pmatrix} T_v^{-1} \begin{pmatrix} V_{br} - V_{AC}^{\Sigma} \\ -V_{AC}^{\Delta} \end{pmatrix} = \begin{pmatrix} \frac{2}{L_{br}} & 0 \\ 0 & \frac{1}{2L_{br}} \end{pmatrix} \begin{pmatrix} V_{br} - V_{AC}^{\Sigma} \\ -V_{AC}^{\Delta} \end{pmatrix}.$$

Therefore, one can deduct the capacitors and inductances in the equivalent circuit:

$$C_{eq\Sigma} = 2C_{br}, \; C_{eq\Delta} = \frac{C_{br}}{2} \tag{16}$$

and $$L_{eq\Sigma} = \frac{L_{br}}{2}, \; L_{eq\Delta} = 2L_{br}.$$

FIG. 5 shows a further exemplary embodiment of a converter 10 which is a further development of the above-shown embodiments. In FIG. 5, an independent energy control variant of the method is shown. The control module 81 comprises a first number Z of total energy control blocks 86, 170. Thus, each of the first number Z of MMCs 13, 110 is controlled by a separate control loop, wherein each control loop comprises one of the first number Z of total energy control blocks 86, 170, one of the first number Z of inner control blocks 87, 131, one of the number Z of reference computation blocks 126, 127 and one of the first number Z of valve control modules 83, 125. The first terminal control block 88 provides the second voltage reference signal VM_ref to each of the first number Z of reference computation blocks 126, 127.

Thus, the energy provided by the first number Z of MMCs 13, 110 is split in equal parts. Thus, the DC voltage reference VDCtot_ref is provided as an input to each of the first number Z of total energy control blocks 86, 170. Each of the first number Z of MMCs 13, 110 provides a portion 1/Z of the total energy provided by the converter 10. Alternatively, the value VDCtot_ref/Z is provided to each of the total energy control blocks 86, 170.

Using the symbols shown in FIG. 5, in case the first number Z equals 2, the branch control signals VAC_ref1, VAC_ref1 for the first and the second MMC 13, 110 are calculated according to the equations:

VAC_ref1=VG_ref1−VM_ref−Vbal_ref1

VAC_ref2=VG_ref2−VM_ref−Vbal_ref2 wherein VG_ref1, VG_ref1 are two first voltage reference signals, VM_ref is the second voltage reference signal and Vbal_ref1, Vbal_ref2 are two inner voltage reference signals (wherein each of these seven signals include partial signals).

In this variant of the method, it is assumed that the two MMCs 13, 110 are independent and two total energy controllers are implemented. The sum of the two total energy control blocks 86, 170 which can be named energy controllers is equal to the total energy inside the converter 10. Each MMC 13, 110 has their own reference as:

$$\frac{1}{9}\sum_{x,y,n} V_{DC_{xyn}}^{Z} = V_{DC_{ref}}^{Z}.$$

As explained above with respect to FIG. 3A, the at least an average DC voltage reference VDC_avg_ref includes the first number Z of average DC voltage references VDC_avg_ref1, VDC_avg_ref2. One of the first number Z of the average DC voltage references VDC_avg_ref1, VDC_avg_ref2 is a function of the detected or measured capacitor voltages $$V_{DC_{xyn}}^{z}$$

or Vc of the capacitors 105 of the cells 23 of each branch 14 to 22 of one of the first number Z of modular-multilevel converters 13, 110. Thus, each of the first number Z of modular-multilevel converters 13, 110 is controlled using its own average DC voltage reference VDC_avg_ref1, VDC_avg_ref2. The average DC voltage references VDC_avg_ref1, VDC_avg_ref2 can be calculated using the equations:

$$V_{DC\_avg\_ref1} = \frac{1}{9} \sum_{k,y,n} V_{DC_{xyn}}^{z=1},$$

$$V_{DC\_avg\_ref2} = \frac{1}{9} \sum_{k,y,n} V_{DC_{xyn}}^{z=2},$$

wherein $$V_{DC_{xyn}}^{z=1}$$

are the detected or measured capacitor voltages of the capacitors 105 of the cells 23 of each branch 14 to 22 of the first MMC 13 and $$V_{DC_{xyn}}^{z=2}$$

are the detected or measured capacitor voltages of the capacitors 105 of the cells 23 of each branch 14 to 22 of the second MMC 110. The first number Z may be larger than 2. Thus, an average DC voltage reference VDC_avg_refz of a "z-th" MMC can be determined using the equation:

$$V_{DC\_avg\_refz} = \frac{1}{9} \sum_{k,y,n} V_{DC_{xyn}}^{Z},$$

wherein $$V_{DC_{xyn}}^{z}$$

are the detected or measured capacitor voltages of the capacitors 105 of the cells 23 of each branch 14 to 22 of the "z-th" MMC.

Each MMC of the first number Z of MMCs 13, 110 has its own average DC voltage reference VDC_avg_refz for generating its inner voltage reference signals Vbal_ref1, Vbal_ref2.

In an example, each MMC of the first number Z of MMCs 13, 110 has its own DC link voltage reference or its own virtual DC link voltage reference VDCtot_ref_z provided, e.g., by an external source such as a system computer. In an alternative example, each MMC of the first number Z of MMCs 13, 110 has the same DC link voltage reference or the same virtual DC link voltage reference VDCtot_ref provided, e.g., by an external source such as a system computer.

The branch reference is computed as $$V_{AC_{xy}}^{z*} = V_{ACg_x}^{z*} - V_{ACm_y}^{*} + V_{ACbal_{xy}}^{z*}.$$

Compared to the branch-based control, the first voltage reference (which may be a grid voltage reference) depends on the MMC. In this variant of the method, two grid currents are controlled instead of one in order to balance the two MMCs 13, 110. The parallel current is, e.g., not used for control.

Several MMCs 13, 110 in parallel can be controlled. Thus, the first number Z can be higher than two. This section describes how to generalize the previous concepts for the first number of Z MMCs in parallel with Z>2. Starting from the branch-based control, the reference transformation matrix is modified such that:

$$T_v = \begin{pmatrix} \frac{1}{n} & \cdots & \frac{1}{n} & \frac{1}{n} \\ 1 & \cdots & -\frac{1}{n_\cdot - 1} & -\frac{1}{n_\cdot - 1} \\ \vdots & \ddots & \vdots & \vdots \\ -\frac{1}{n_\cdot - 1} & \cdots & 1 & -\frac{1}{n_\cdot - 1} \end{pmatrix}$$

$$T_i = \begin{pmatrix} 1 & \cdots & 1 & 1 \\ \frac{n-1}{n} & \cdots & -\frac{1}{n} & -\frac{1}{n} \\ \vdots & \ddots & \vdots & \vdots \\ -\frac{1}{n} & \cdots & \frac{n-1}{n} & -\frac{1}{n} \end{pmatrix}$$

and the equivalent capacitor and inductor as $$C_{eq}^{\Sigma} = nC_{br}, \; C_{eq}^{\Delta 1} = C_{eq}^{\Delta 2} = \ldots = C_{eq}^{\Delta(n-1)} = \frac{(n-1)C}{n},$$

$$L_{eq}^{\Sigma} = \frac{L}{n}, \; L_{eq}^{\Delta 1} = L_{eq}^{\Delta 2} = \ldots = L_{eq}^{\Delta 2} = \frac{nL}{n-1}.$$

For the converter-based control, n−1 control loop are added such that:

$$C_{eq} \frac{d\left(U_{DC_{00}}^{i} - \frac{\sum_{j=1,j\neq i}^{n} U_{DC_{00}}^{j}}{n-1}\right)}{dt} =$$

$$I_{DC_{00}}^{i} - \frac{\sum_{j=1,j\neq i}^{n} I_{DC_{00}}^{j}}{n-1} \text{ for all } i = \{1, \ldots, n\}$$

and $$L_{eq} \frac{d\left(I_{AC_{00}}^{i} - \frac{\sum_{j=1,j\neq i}^{n} I_{AC_{00}}^{j}}{n-1}\right)}{dt} =$$

$$U_{AC_{00}}^{j} - \frac{\sum_{j=1,j\neq i}^{n} U_{AC_{00}}^{j}}{n-1} \text{ for all } i = \{1, \ldots, n\}.$$

One may refer to the equations of the equivalent circuit with $C_{eq}=C_{br}$ and $L_{eq}=L_{br}$. Finally, the reference is computed to be added to the n converters (here n is the first number Z) as:

$$\begin{pmatrix} V^{1*}_{par} \\ V^{2*}_{par} \\ \vdots \\ V^{n-1*}_{par,} \\ V^{n*}_{par} \end{pmatrix} = \begin{pmatrix} \dfrac{n-1}{n} & 0 & \cdots & 0 \\ 0 & \dfrac{n-1}{n} & \cdots & \vdots \\ \vdots & \vdots & \ddots & \vdots \\ \vdots & \vdots & \vdots & \dfrac{n-1}{n} \\ -\dfrac{n-1}{n} & -\dfrac{n-1}{n} & \cdots & -\dfrac{n-1}{n} \end{pmatrix} \begin{pmatrix} \Delta V^{1*}_{00} \\ \Delta V^{2*}_{00} \\ \vdots \\ \Delta V^{n-1*}_{00} \end{pmatrix}$$

The independent energy control does not require any modification except that the total energy controllers 86, 170 and the inner control blocks 87, 131 are duplicated to be equal to the number of MMCs 13, 110 in parallel and the equivalent circuits are adapted accordingly.

This disclosure proposes different variants of a method to control several MMCs 13, 110 in parallel in order to increase the system power. For two parallel MMCs 13, 110, the capacitor voltages Vc are balanced either by Converter-based control: Using one energy controller 86, two inner control blocks 87, 131 which may be named inner controllers and an extra balancing loop 130, Branch-based control: Using one energy controller 86, changing the voltage/current reference frame and control the average/difference of the capacitor voltages Vc, Independent energy control: Using two energy controllers 86, 170 and two inner controllers 87, 131.

The variants of the method implement a cascaded capacitor voltage control and branch current control for the balancing.

The converter-based control uses the average parallel current to balance the capacitor voltage Vc between the two MMCs 13, 110 and the circulating current to internally balance the capacitor voltage Vc of each MMC 13, 110. It is assumed that the MMC 13, 110 are independent in terms of inner control and the additional loop allows the balancing.

The branch-based control sees the converter 10 as one big unit composed of parallel branches and in a first step uses circulating currents to balance each branch unit and in a second step each parallel branch with the parallel current. The control is not based on any assumption and therefore the number of controlled variables is minimized.

The independent energy control assumes the MMC 13, 110 being independent and a different first voltage reference (which may be grid voltage reference) ensures the balancing. The parallel current is not used for the control but the grid current instead.

FIG. 6 shows an exemplary embodiment of an arrangement 115 with a converter 10 which is a further development of the above-shown embodiments. The converter 10 comprises inductances 71 to 73, 71' to 73' separately coupling each of the first number Z of MMC 13, 110 to the first terminal 11. The converter 10 includes further inductances 74 to 76, 74' to 76' coupling each of the first number Z of MMCs 13, 110 to the second terminal 12. As indicated in FIG. 6 similar to FIG. 1A, the nine branches, which can be also called legs or arms, of the first MMC 13 are connected to three connection lines and these three connection lines are coupled via the first, the second and the third inductances 71 to 73 to the first terminal 11. At the first terminal 11 the three phases u, v, w are tapped. Correspondingly, the nine branches of the first MMC 13 are also connected to further three connection lines which are coupled by the fourth to the sixth inductances 74 to 76 to the second terminal 12. At the second terminal 12 the three phases a, b, c are tapped. In the same manner, the inductances 71' to 73' and further inductances 74' to 76' couple the second MMC 110 to the first and the second terminal 11, 12. Thus, the converter 10 includes six inductances 71 to 76 per each MMC 13, 110. As shown in FIG. 1A, each branch of each MMC 13, 110 also includes the branch inductance 27.

Thus, the hardware of the MMCs 13, 110 is modified by adding converter inductances 71 to 76, 71' to 76' on the input and output side to reduce the parallel current and consequently the derating. However, the losses and the system cost may be higher. The converter inductances 71 to 76, 71' to 76' can be combined with the control modifications such as, e.g., the different variants to control the first number Z of MMCs 13, 110 in parallel. In FIG. 6, additional grid/motor inductances are illustrated. By observing the equivalent circuit of FIG. 2B, one may deduce that the switches are not perfectly synchronized if the two equivalent voltage sources do not have exactly the same value and there is a current flowing between the MMCs 13, 110. This issue occurs in a non-ideal converter 10 as the branch inductances 27 do not have exactly the same value. As mentioned before, this leads to the peaks as presented in FIG. 2D, which also increases the peak branch current and therefore introduce a derating. This component of the parallel current cannot be eliminated with the control as it originates from the modulation. In order to mitigate it, one option would be to add three inductances 71 to 73, 71' to 73' on the machine side and three inductances 74 to 76, 74' to 76' on the grid side of the two MMCs 13, 110 (resulting in 12 inductances in total) as shown in FIG. 6.

With this alternative, it may be necessary to adapt the equivalent inductance of the total energy controller 86 and the first terminal control block 88 being, e.g., a motor controller. For the converter-based control, the equivalent circuit of the balancing loop is modified such that $L_{eq}=L_{br}+2L_{conv}$ and for the branch-based control, there is not any change in $$L^{\Sigma}_{eq},$$

but for the difference control it can be concluded that $$L^{\Delta}_{eq} = 2L_{br} + 4L_{conv}.$$

For the independent energy controller variant of the method, the equivalent circuit of the inner control do not change as there is no loop to balance the capacitor voltage Vc between the MMCs 13, 110.

In an alternative embodiment, not shown, the inductances 74 to 76, 74' to 76' are omitted and replaced by connection lines.

In an alternative embodiment, not shown, the inductances 71 to 73, 71' to 74' are omitted and replaced by connection lines.

Figures 7A, 7B:
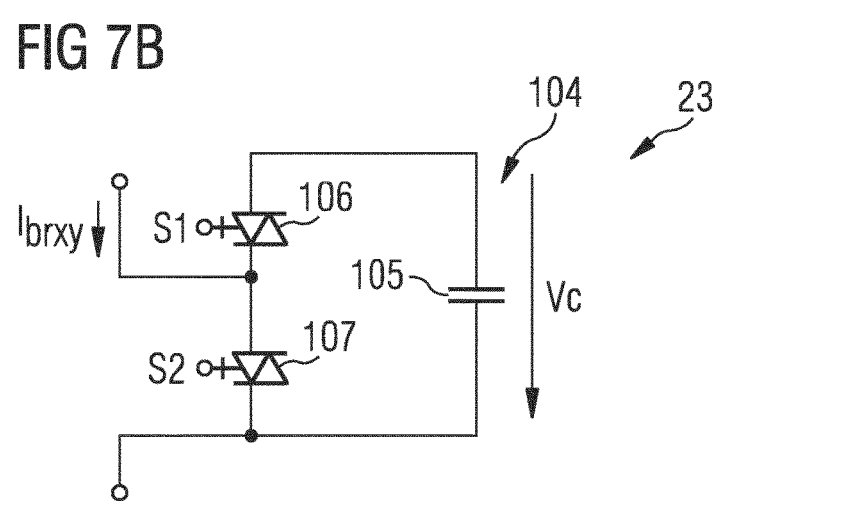

FIG. 7A shows an exemplary embodiment of an arrangement 115 with a converter 10 which is a further development of the above-shown embodiments. The converter 10 is realized as an AC/DC converter. The AC/DC converter can also be used as DC/AC converter. The converter 10 is implemented as a double star converter, especially as a double star AC/DC converter. The converter 10 includes a first number Z of MMCs 13, 110. The first MMC 13 comprises a first to a third node 181 to 183 which are coupled via three branches 14 to 16 to a positive terminal 184 of a DC terminal 185 of the converter 10. Moreover, the first to the third node 181 to 183 are coupled via the fourth to the sixth branch 17 to 19 to a negative terminal 186 of the DC terminal 185. The first to the sixth branch 14 to 19 can be realized as shown in FIG. 1A.

Moreover, the converter 10 comprises a first to a third star inductance 187 to 189 coupling the first to the third node 181 to 183 to an AC terminal 190 of the converter 10. The AC terminal 190 can be realized such as the first terminal 11 shown in FIG. 1A. Correspondingly, the DC terminal 185 can be called second terminal 12. Thus, the first MMC 13 comprises exactly six branches 14 to 19. A motor or a machine 118 is coupled, e.g., to the AC terminal 190.

Moreover, the converter 10 comprises the second MMC 110 that is realized such as the first MMC 13 shown in FIG. 7A. The converter 10 comprises a further first to a further third star inductance 187' to 189' coupling the second MMC 110 to the AC terminal 190 of the converter 10. Thus, the first number Z of MMCs 13, 110 is connected in parallel between the DC terminal 185 and the AC terminal 190. The control arrangement 80 as shown in FIGS. 3A to 5 can also be used as a control arrangement for the converter 10 shown in FIG. 7A. The above described methods can be extended similarly for parallel double star converters, which could have applications, e.g., for HVDC systems or for rail systems.

The structure of the MCCs 13, 110 is similar as shown in "Control of Parallel-Converter Modular Multilevel Converters", Feng Gao et al., IEEE Transactions on Power Electronics, Vol. 30, No. 1, pp. 372-386, 2015.

FIG. 7B shows an example of a cell 23 which is a further development of the above shown examples. The cell 23 comprises the first and the second semiconductor switch 106, 107 that are connected in a half-bridge configuration. The cell 23 is fabricated as a half-bridge cell. The first valve control module 83 provides two cell control signals S1, S2 to the two semiconductor switches 106, 107. The cell of FIG. 7B may be used in the converter 10 of FIG. 7A.

The methods can be applied to a matrix converter, a direct converter (as shown in FIGS. 2A to 5) and a pumped hydro system, realizing a parallel connection of MMCs. The method implements cascaded control and results in capacitor balancing, in a control of parallel current, in a control of circulating current and in a reduction of voltage ripple. Reference frames are calculated.

In an embodiment, a converter 10 comprises a control arrangement 80 and a first number Z of MMCs 13, 110 which are coupled in a parallel circuit. The first number Z is larger than 1. Each of the first number Z of MMCs 13, 110 comprises a number M of branches 14 to 22 which each comprises at least a cell 23 with a capacitor 105 and semiconductor switches 106 to 109. A method for operating the converter 10 comprises generating at least a first voltage reference signal VG_ref, a second voltage reference signal VM_ref and at least an inner voltage reference signal Vbal_ref, combining these signals into a branch control signal VAC_ref, generating cell control signals S1 to S4 and providing the cell control signals S1 to S4 to the semiconductor switches 106 to 109 of the cells 23. The control arrangement 80 is configured to balance the capacitor voltages Vc of the cells 23 to 25.

The embodiments shown in the FIGS. 1 to 7B as stated represent exemplary embodiments of the improved converter and method for operating a converter; therefore, they do not constitute a complete list of all embodiments according to the improved converter and method for operating a converter. Actual converters and methods may vary from the embodiments shown in terms of arrangements, devices, modules, blocks, steps and signals for example.

The described method and the described converter (which can be named system) have, e.g., some of the following features. The method is configured for a control of several parallel direct MMCs or double star MMCs. The direct MMCs or double star MMCs system can be realized with or without extra converter inductances on both sides. One or several balancing loops are configured for controlling the difference between the converter capacitor voltages on average. The balancing of the converters is achieved, e.g., with an additional common mode voltage reference component. A matrix is configured to transform the capacitor voltage or the branch currents to another reference frame corresponding to their sums and one or several differences. The control is performed in the sum/difference reference frame. The capacitors balancing is achieved with several inner controllers balancing the capacitors of their respective units. Alternatively, several total energy controllers are used and adjust the energy stored in their respective converter.

In the following text, further aspects of the present disclosure are specified. The individual aspects are enumerated in order to facilitate the reference to features of other aspects.

The invention claimed is:

1. A method for operating a converter that comprises a control arrangement and Z modular-multilevel converters that are coupled in a parallel circuit, wherein each of the Z modular-multilevel converters comprises M branches, each of the M branches comprises cells with a capacitor and respective semiconductor switches, each of the Z modular-multilevel converters is configured to accept or provide a three-phase AC voltage, corresponding inputs of each of the Z modular-multilevel converters are connected together, corresponding outputs of each of the Z modular-multilevel converters are connected together, and Z and M are each an integer greater than one, the method comprising:

generating Z first voltage reference signals by a control module of the control arrangement as a function of a DC voltage reference and Z measured signals gained at the Z modular-multilevel converters;

generating a second voltage reference signal by the control module as a function of a first terminal reference;

generating an inner voltage reference signal by the control module as a function of at least an average DC voltage reference and of branch capacitor voltage signals generated by detecting capacitor voltages of the capacitors of the cells of each branch;

combining the Z first voltage reference signals, the second voltage reference signal and the inner voltage reference signal into a branch control signal for each branch of each modular-multilevel converter by a reference computation module of the control arrangement;

generating cell control signals by Z valve control modules of the control arrangement as a function of the branch control signals, wherein each cell control signal of the cell control signals is a function of the Z first voltage reference signals, the second voltage reference signal and the inner voltage reference signal; and providing the cell control signals to each of the respective semiconductor switches of each of the cells of each of the M branches of each of the Z modular-multilevel converters.

2. The method of claim 1, wherein the reference computation module adds or subtracts at least one of the Z first voltage reference signals, the second voltage reference signal or the inner voltage reference signal for combining these signals into the branch control signal for each branch of each modular-multilevel converter.

3. The method of claim 1, wherein the control module is configured to:
receive the branch capacitor voltage signals;
generate Z inner voltage reference signals as a function of Z average DC voltage references and of the branch capacitor voltage signals; and
provide the Z inner voltage reference signals to the reference computation module.

4. The method of claim 1, wherein the reference computation module comprises Z reference computation blocks, and wherein a block of the Z reference computation blocks is configured to:
generate the branch control signal as a function of a first voltage reference signal of the Z first voltage reference signals, the second voltage reference signal and an inner voltage reference signal of Z inner voltage reference signals; and
provide the branch control signal to a valve control module of the Z valve control modules.

5. The method of claim 1, wherein each branch comprises N cells and a branch inductance that form a series circuit, N being an integer greater than one.

6. The method of claim 1, wherein each modular-multilevel converter of the Z modular-multilevel converters comprises a first terminal and a second terminal and wherein the M branches are respectively coupled to the first terminal via a first inductance, a second inductance and a third inductance of the converter.

7. The method of claim 1, wherein each modular-multilevel converter of the Z modular-multilevel converters comprises a first terminal and a second terminal and wherein the M branches are respectively coupled to the second terminal via a fourth inductance, a fifth inductance and a sixth inductance of the converter.

8. The method of claim 1,
wherein each branch of the M branches comprises N cells and a branch inductance which form a series circuit, N being an integer greater than one;
wherein each modular-multilevel converter of the Z modular-multilevel converter comprises a first terminal and a second terminal;
wherein the M branches are respectively coupled to the first terminal via a first inductance, a second inductance and a third inductance of the converter; and
wherein the M branches are respectively coupled to the second terminal via a fourth inductance, a fifth inductance and a sixth inductance of the converter.

9. The method of claim 1,
wherein the converter is realized as a direct AC/AC converter; and
wherein each branch comprises N cells that are realized as full-bridge cells, N being an integer greater than one.

10. The method of claim 1,
wherein the converter is realized as a double star AC/DC converter; and wherein each branch comprises N cells which are realized as half-bridge or full-bridge cells, N being an integer greater than one.

11. The method of claim 1,
wherein the DC voltage reference is realized as a DC link voltage reference or a virtual DC link voltage reference; and
wherein the first terminal reference is a motor speed reference, an active power reference or a further grid voltage reference.

12. The method of claim 1,
wherein the average DC voltage reference includes Z average DC voltage references; and
wherein one of the Z average DC voltage references is a function of detected capacitor voltages of the capacitors of the cells of each branch of one of the Z modular-multilevel converters.

13. A converter, comprising
Z modular-multilevel converters that are coupled in a parallel circuit, wherein each modular-multilevel converter of the Z modular-multilevel converters comprises M branches, each branch comprises cells with a capacitor and respective semiconductor switches, each modular-multilevel converter of the Z modular-multilevel converters is configured to accept or provide a three-phase AC voltage, corresponding inputs of each of the Z modular-multilevel converters are connected together, corresponding outputs of each of the Z modular-multilevel converters are connected together, and Z and M are each an integer greater than one; and
a control arrangement configured to:
generate Z first voltage reference signals as a function of a DC voltage reference and Z measured signals gained at the Z modular-multilevel converters;
generate a second voltage reference signal as a function of a first terminal reference;
generate an inner voltage reference signal as a function of an average DC voltage reference and of branch capacitor voltage signals generated by detecting capacitor voltages of the capacitors of the cells of each branch;
combine the Z first voltage reference signals, the second voltage reference signal and the inner voltage reference signal into a branch control signal for each branch of each modular-multilevel converter;
generate cell control signals as a function of the branch control signals, wherein each cell control signal of the cell control signals is a function of the Z first voltage reference signals, the second voltage reference signal and the inner voltage reference signal; and
provide the cell control signals to each of the respective semiconductor switches of each of the cells of each of the M branches of each of the Z modular-multilevel converters.

14. The converter of claim 13, wherein the control arrangement includes Z valve control modules that are configured to generate the cell control signals.

15. The converter of claim 13,
wherein each branch comprises N cells and a branch inductance which form a series circuit, N being an integer greater than one;
wherein each modular-multilevel converter of the Z modular-multilevel converters comprises a first terminal and a second terminal;

wherein the branches are respectively coupled to the first
terminal via a first inductance, a second inductance and
a third inductance of the converter; and wherein the branches are respectively coupled to the
second terminal via a fourth inductance, a fifth induc-
tance and a sixth inductance of the converter.

16. The converter of claim 13, wherein the converter is realized as a direct AC/AC
converter; and wherein each branch comprises N cells that are realized as
full-bridge cells, N being an integer greater than one.

17. The converter of claim 13, wherein the converter is realized as a double star AC/DC
converter; and wherein each branch comprises N cells which are realized
as half-bridge or full-bridge cells, N being an integer
greater than one.

18. The converter of claim 13, wherein the DC voltage reference is realized as a DC link
voltage reference or a virtual DC link voltage refer-
ence; and wherein the first terminal reference is a motor speed
reference, an active power reference or a further grid
voltage reference.

19. The converter of claim 13, wherein the average DC voltage reference includes Z
average DC voltage references; and wherein one of the Z average DC voltage references is a
function of detected capacitor voltages of the capacitors
of the cells of each branch of one of the Z modular-
multilevel converters.

20. A non-transitory computer readable medium compris-
ing instructions to cause a converter to execute a method, the
converter comprising Z modular-multilevel converters that
are coupled in a parallel circuit, wherein each of the Z
modular-multilevel converters comprises M branches, each
branch comprises cells with a capacitor and respective
semiconductor switches, each modular-multilevel converter
of the Z modular-multilevel converters is configured to
accept or provide a three-phase AC voltage, corresponding
inputs of each of the Z modular-multilevel converters are
connected together, corresponding outputs of each of the Z
modular-multilevel converters are connected together, and Z
and M are each an integer greater than one, the method
comprising:

generating Z first voltage reference signals as a function
of a DC voltage reference and Z measured signals
gained at the Z modular-multilevel converters;

generating a second voltage reference signal as a function
of a first terminal reference;

generating an inner voltage reference signal as a function
of at least an average DC voltage reference and of
branch capacitor voltage signals generated by detecting
capacitor voltages of the capacitors of the cells of each
branch;

combining the Z first voltage reference signals, the second
voltage reference signal and the inner voltage reference
signal into a branch control signal for each branch of
each modular-multilevel converter;

generating cell control signals as a function of the branch
control signals, wherein each cell control signal of the
cell control signals is a function of the Z first voltage
reference signals, the second voltage reference signal
and the inner voltage reference signal; and providing the cell control signals to each of the respective
semiconductor switches of each cell of each of the M
branches of each of the Z modular-multilevel convert-
ers.

* * * * *